US008675906B2

(12) United States Patent
Lau

(10) Patent No.: US 8,675,906 B2
(45) Date of Patent: Mar. 18, 2014

(54) FLAT PANEL SPEAKER MOUNTING SYSTEM WITH REMOTE OPERATION

(76) Inventor: Ka Wai Lau, Brooklyn, NY (US)

( * ) Notice: Subject to any disclaimer, the term of this patent is extended or adjusted under 35 U.S.C. 154(b) by 0 days.

(21) Appl. No.: 13/374,756

(22) Filed: Jan. 11, 2012

(65) Prior Publication Data

US 2013/0230200 A1 Sep. 5, 2013

Related U.S. Application Data

(63) Continuation-in-part of application No. 11/810,096, filed on Jun. 5, 2007, now Pat. No. 8,111,865.

(51) Int. Cl.
*H04N 5/60* (2006.01)

(52) U.S. Cl.
USPC .......................................... 381/388; 381/386

(58) Field of Classification Search
USPC .......................................... 381/332, 388, 386
See application file for complete search history.

(56) References Cited

U.S. PATENT DOCUMENTS 3,976,162 A * 8/1976 Cummings .................. 181/141
6,527,237 B2 * 3/2003 Harary et al. ............ 248/221.11
8,150,093 B2 * 4/2012 Ueno ........................... 381/388

* cited by examiner

*Primary Examiner* — Roy Potter
(74) *Attorney, Agent, or Firm* — Richard L. Strauss, Esq.

(57) ABSTRACT

An apparatus for mounting two speakers to a flat panel display device is disclosed which engages standardized mounting plates formed in such displays. The apparatus may be utilized with flat panel mounting devices, such as pedestal, wall or ceiling mounts. The apparatus provides adjustments of the position of each speaker mounted in regard to height, fore/aft and depth position, as well as rotation about an X, Y and Z axis. The apparatus enables changes relative to one or more of the aforementioned adjustments without altering other aspects of speaker position. A second alternate preferred embodiment of the disclosed mounting device provides remote actuation and locking of a pivot joint and a sliding joint.

18 Claims, 14 Drawing Sheets

FLAT PANEL SPEAKER MOUNTING SYSTEM WITH REMOTE OPERATION

CONTINUITY DATA

The present application is a continuation-in-part patent application claiming priority to U.S. application Ser. No. 11/810,096, filed Jun. 5, 2007 now U.S. Pat. No. 8,111,865.

TECHNICAL FIELD

The apparatus disclosed herein relates most closely to the technical field of speaker mounting devices. More specifically, the present apparatus relates to the field of devices utilized for mounting speakers—as well as other peripheral devices—to any type or form of flat panel display devices such as, for example, LCD monitors and televisions.

BACKGROUND OF THE ART

The term "flat panel display device" refers to an electronic display in which a large orthogonal array of display elements, such as liquid-crystal (e.g., LCD) or electro luminescent (e.g., plasma) elements, form a flat screen. The term "flat-panel display" is somewhat deceptive in that it is the thinness of the display that is the paramount characteristic. In the past, both television sets and computer monitors commonly utilized cathode-ray tubes. This technology can never be very thin (relative to flat panel display devices) in that cathode ray tubes generate light via the process of cathodoluminescence. In this process, a high-energy electron beam is scanned across a screen covered with an inorganic phosphor. Substantial tube depth is necessary to allow the electron beam to be magnetically or electrostatically scanned across the entire screen.

Flat panel monitors and televisions, including LCD and plasma display units, have become increasingly popular. Among other advantages related to flat screen technology, LCD and plasma displays are packaged in units having greatly reduced weight and housing depth (as opposed to earlier CRT display devices). Reduced weight and depth dimensions enable placement and use of flat panel display devices in rooms where limited space would obviate the use of conventional CRT technology.

The aforementioned reduced weight and depth of flat panel display devices has enabled such monitors and televisions to be mounted, via wall mount systems in convenient areas of a room. Many such wall mounting systems are now available to suit a myriad of mounting needs. In addition to wall mounting, LCD and plasma flat panel monitors and televisions may also be mounted upon what is best described as a pedestal mount. Such mounting systems enable the flat panel to be supported by a table or other flat surface located beneath the display.

In order to facilitate the production of various wall, ceiling and pedestal type mounts for flat screen displays, manufacturers of flat panel display devices have subscribed to a mounting configuration convention wherein a receiving plate, especially configured and adapted for receipt of mounting bolts is located on the back panel of such devices. The diameter of such mounting holes, as well as the location and distance between such holes is set forth in a standard known as the VESA standard.

A majority of flat panel monitors and televisions are now compliant with the VESA standard. The VESA standard calls for an industry mounting interface standard. More specifically, the VESA standard requires a specific hole pattern on the back of the monitor, screen or display. This standardized hole pattern enables wall, desktop or ceiling mounts having a corresponding hole pattern, to properly align with and be affixed to VESA compliant flat screen monitors and televisions. The VESA standard mounting hole patterns that are presently utilized may be summarized as follows: For smaller and medium flat panels, LCD monitors and television displays being from 12" to 22.9" diagonal, and falling in a weight range up to 30.8 lbs (14 kg), the hole pattern is: 75 mm×75 mm or 100 mm×100 mm (2.95"×2.95" or 3.94"×3.94"). Larger monitors with viewing screen from 23" to 30.9" diagonally, and a weight range up to 50 lbs: utilized a VESA standard of 200 mm×100 mm and 200 mm×200 mm. In regard to LCD and plasma displays having a diagonal measurement of from 31" to 90", and a weight not greater than 250 lbs, various hole patterns—all having 200 mm increments—are utilized such as, for example: 400 mm×200 mm, or 600 mm×400 mm, or 800 mm×400 mm The term "VESA" refers to "Video Electronics Standards Association" which is an international non-profit corporation. The corporation promotes and develops timely, relevant, open standards for the display and display interface industry, ensuring interoperability and encouraging innovation and market growth. The standards provided by VESA provide specific guidelines of the mounting hole pattern placement—as described above—screw size, and guidelines for the mounting pad or mounting apparatus to be utilized by equipment manufacturers based on a the size of the screen and monitor's weight.

Flat screen display devices are becoming the major display format for viewing television, recorded movies and video gaming. Although many flat panel monitors and televisions now include built-in speakers, such often provide sub-optimal sound production. However, the majority of such devices include "audio out" terminals to which external speakers may be attached. Utilizing external speakers with flat panel displays provides two major advantages in regard to built in sound systems. Firstly, higher quality speakers may be utilized which produce better sound and expanded frequency range. Secondly, external speakers may be positioned, in regard to the display, so as to optimize stereo separation while also producing sound which seems to be coming directly from the source depicted upon the screen (rather than producing sound which seems to come, for example, from below the action).

Mounting systems have been produced for affixing external speakers to flat panel televisions and monitors. However, such mounting systems have been limited in providing limited adjustment as to the position of the speaker in relation to the display. Also, heretofore, no speaker mounting system has been disclosed which easily and securely mounts to the majority of flat panel televisions and monitors. It would be highly advantageous if a speaker mounting apparatus, especially adapted for mounting speakers to a flat panel display would be provided wherein the apparatus enables adjustment of external speaker position in regard to six parameters including: speaker separation, speaker height, speaker depth, upward/downward speaker angulation and inboard/outboard speaker angulation and left/right tilt (canting). It would be further advantageous if such an apparatus included a means to affix the device to a flat panel television or monitor utilizing the VESA standard mounting holes provided in the majority of such display devices.

Recently, their has been an industry wide trend towards designing, configuring, producing and marketing flat panel televisions demonstrating extremely diminutive depth dimensions. Although such "slimmer and thinner" flat panels displays have been and continue to be esthetically pleasing (as well as highly marketable), the resulting decrease in flat panel cabinet depth and the limitations created thereby, has greatly effected the placement of quality speakers within such cabinets. Simply put, the extremely thin speakers that can be mounted within such reduced depth cabinets are often inferior in sound quality when compared to larger speaker units that were previously placed in the previous generation of flat panel televisions having greater depth dimensions. The term "flat panel depth dimension" when utilized throughout this application and within the claims refers to the distance from the front surface (the viewing surface wherein an image is provided) of a flat panel monitor or television and the back panel of such devices wherein VESA mounting holes are located.

It is well known that superior sound can be provided for such reduced depth flat panel display televisions via the use of a series of external speakers mounted at various locations within the viewing area—often utilizing an external amplifier for increased sound production. However, there is a need for a simpler means of attaining enhanced sound performance from such reduced depth flat panel displays without necessitating the mounting of further speakers about the viewing room which may or may not require the use of an external amplifier. Thus, it would be highly desirable to provide a means of easily and simply affixing high quality speakers to the aforementioned "slimmer and thinner" flat panel display devices without need for mounting such speakers remotely from the television or utilizing, in certain embodiments, an external amplifier.

SUMMARY OF THE INVENTION

Now, in accordance with the present invention, a speaker mounting apparatus is disclosed, especially adapted and configured to enable mounting of at least two speakers thereupon and to be affixed to a flat panel display device by means of standardized mounting holes located within the rear portion of such devices with or without simultaneous use of a flat panel mounting bracket. The speaker mounting apparatus of the present invention enables independent adjustment of the positioning of the at least two speakers, in relation to the flat panel display in regard to six different position parameters:

1. lateral distance from the display (e.g. from the right and left sides of the panel) as well as physical separation between the at least two speakers;
2. height of each speaker,
3. depth of each speaker, (which may also be described as fore/aft position);
4. upward/downward tilt, (which may also be described as pitch or rotation about the X axis—the axis of rotation of such movement being located at the below-described joint providing such tilt—;
5. inboard/outboard speaker tilt, which may also be described as yaw or rotation about a Y axis—the axis of rotation of such movement being located at the below-described joint providing such tilt—;
6. right/left canting, which may also be described as roll or rotation about a Z axis—the axis of rotation of such movement being located at the below-described joint providing such canting—.

The first preferred embodiment of the present invention is comprised of at least one mounting bracket, at least one horizontal receiving arm, two extension tubes, two pivot arms, two pivot brackets, two sway arms, two intermediate arms, two tertiary arms, two platform arms and two speaker platforms. The at least one mounting bracket may be configured, for example, so as to engage mounting bolt receiving holes within the flat panel display's rear surface on both the right and left sides thereof. In such instances, rather than utilizing two independent mounting brackets—to engage one or more right an left receiving holes, a single mounting bracket may serve to engage both said right and left holes. The components of the first preferred embodiment include joints therebetween, as discussed immediately below, that enable the aforementioned speaker position adjustments. In regard to the term "relative height", such term refers to the height of a speaker relative the flat panel display device upon which it is mounted. Thus, an increase in relative height of a speaker mounted upon the device of the present invention would indicate the speakers position moving towards, to, and/or beyond the top or upper extent of the flat panel display when mounted in the usual manner they are mounted to view the display. The term "relative depth" refers to the depth of a speaker mounted via the device of the present invention relative to what may be described as the planar surface that comprises (and from which the name flat panel is derived). For example, an increasing depth position of the speaker would mean the speaker position is moving from, for example, a neutral position parallel to the front planar surface of the display device to a position towards the rear of the device. A decrease in depth would mean the speaker is moving forward, towards a direction in front of the front planar surface of the panel.

The aforementioned adjustments to speaker position are achieved utilizing the various pivoting, extending and rotating joints incorporated within the device of the present invention, described in more detail, below. The device of the present invention comprises, in a preferred embodiment thereof, a horizontal receiving arm, having a length, which is mounted, in a horizontal relation, to the back of a flat screen display device via bracket(s) that, in turn, are mounted to the panel utilizing bolts which engage VESA mounting holes incorporated into such flat panel devices and corresponding holes in the bracket(s). The horizontal receiving arm, which is mounted, via the aforementioned bracket(s), to the rear of a flat panel device, includes a channel within which receives two extension arms—one extension arm fitting within and extending from a left and one from a right terminus of the receiving arm. The extension arms are thus slideably mounted within, or in certain alternate preferred embodiments, coaxially about the receiving arms. The extension and retraction of the extension arms away from and back into the receiving arms enables one, as described in greater detail below, to increase or decrease the distance between speakers mounted upon the device. The extension arms each receive, at a distal terminus thereof, a pivot arm which forms, in conjunction with a pivot bracket, a pivot arm/pivot bracket joint. This joint enables adjustment of speaker position in regard to left and right canting of the speaker or what also may be described as rotation about the Z axis or, alternatively, a change in roll position. The pivot bracket, in turn, forms a joint—capable of a pivoting motion—with a sway arm to form a pivot bracket/sway arm joint. This joint enables the device of the present invention to adjustment of speaker position in regard to inboard/outboard speaker tilt (which may also be described as yaw or rotation about a Y axis).

The sway arm is affixed, via a pivoting joint, to an intermediate arm to form a sway arm/intermediate arm joint. This joint provides a rotational or pivoting motion which enables one to adjust speaker position in regard to upward/downward tilt (which may also be described as pitch or rotation about the X axis). Independent motion of this joint (motion of this joint while all other pivoting/rotating joints remain in place) will also effect the relative height, depth and upward/downward tilt of speakers mounted upon the device.

The intermediate arm is joined, via a pivoting joint to a tertiary arm. This joint provides a rotational or pivoting motion which also enables one to adjust speaker position in regard to upward/downward tilt (which may also be described as pitch or rotation about the X axis). Independent motion of this joint will also effect the relative height, depth and upward/downward tilt of speakers mounted upon the device. Adjustment of this joint, in combination with adjustment of the aforementioned sway arm/intermediate arm joint enables one to alter the height of a speaker mounted upon the device without altering upward/downward tilt, or, as it may also be described, enables one to select a desired height independently of a desired upward/downward speaker tilt.

The tertiary arm is joined to a platform arm, (upon which a speaker platform is mounted) via an additional pivot joint—the tertiary arm/platform arm joint. Independent motion of this joint adjusts the upward/downward tilt of a speaker and also effect the relative height and depth of speakers mounted upon the device, as described in more detail, below. Adjustment of this joint, in combination with adjustment of the aforementioned intermediate arm/tertiary arm joint and intermediate arm/sway arm joint enables one to independently select and obtain a desired height, upward/downward tilt and/or relative depth of a speaker. That is to say, one may, by manipulating all three joints, adjust any one or more of the aforementioned height, upward/downward and depth parameters while maintaining the other parameters as desired.

A speaker platform is mounted upon the aforementioned platform arm so as to provide a mounting surface for a speaker. A speaker may be mounted upon the platform via screw, bolt, adhesive putty or any other suitable fastener or material.

The speaker mounting apparatus of the present invention enables full control and adjustment of speaker location for the following purposes. In regard to stereo separation—an effect generated by a right and left channel sound source which, optimally, reproduces sound which appears to originate from different portions of the screen, the present apparatus enables a user to adjust the physical separation of the speakers—the distance of a left speaker from the left side of the display and the distance of a right speaker from the right side of the display—in order to produce optimal stereo sound reproduction.

The speaker mounting apparatus of the present invention also enables adjustment of speaker position in regard to the height at which each speaker is positioned. Such adjustment enables a user to place each speaker at an optimal height in regard to the displayed picture position. Thus, the apparatus of the present invention allows one to mount each speaker at an optimal height in regard to the screen configuration and size of the flat panel device to which it is mounted. Thus, speakers may be placed so that at a height corresponding to the middle of the full height of a particular screen. For example, if a flat panel screen includes a display having a height of 10 inches, and speakers to be mounted thereupon are 5 inches in height, then the mounting apparatus can be adjusted so that each speaker is aligned so that the midpoint of each speaker's height (2.5 inches) is horizontally aligned with the midpoint of the display height (5.0 inches) Speakers positioned in this manner will project sound that appears to originate at the same height as the display rather than above or below the image.

The speaker mounting apparatus of the present invention also enable adjustment of each speaker in regard to inboard and outboard tilt/angulation. This positioning parameter may also be described as rotation about a Y axis or yaw position. Especially in regard to smaller display devices having screen displays of less than 17 inches, positioning of external speakers, in regard to inboard and outboard angulation, enables one to adjust sound projection in regard to the distance at which an individual is ordinarily positioned when listening to sound reproduction. In addition, the ability to tilt speakers inward (inboard) towards the panel, can effectively reduce echoes produced when sound bounces off objects, close to the display, and located to the right and/or left of the display.

The speaker mounting apparatus of the present invention also enable adjustment of each speaker in regard to upward and downward speaker tilt which may also be described as speaker pitch or rotation about an X axis. Especially in regard to wall mounted flat panels, which may be mounted at various heights due to the physical layout of a room in which they are mounted, the ability to adjust speakers so as to project sound—either upward or downward—towards a customary viewing position facilitates superior sound projection and clarity. Thus, the sound performance of a flat panel display mounted at a relatively high position—which does not enable screen tilt—can be improved by adjusting the speaker mounting apparatus to project sound downward. Conversely, sound from a relatively low mounted display device may be improved by adjusting the apparatus to tilt the speakers mounted thereupon upward.

The speaker mounting apparatus of the present invention also enables adjustment of each speaker in regard to right/left canting—which may also be described as speaker roll or rotation about a Z axis. Depending upon the acoustic situation of a given listening/viewing environment, the ability to make changes in speaker canting may help to optimize speaker sound.

The speaker mounting apparatus of the present invention also enable adjustment of each speaker in regard to depth position of each speaker relative to the plane defined by the viewing surface of the flat panel display device. Therefore, each speaker may positioned so that the face of each speaker—which is also, commonly, a flat planar surface—lies even with, behind or in front of the device. Such adjustability, afforded by the apparatus of the present invention, enable one to further optimize sound reproduction, realism and projection by locating each speaker, the source of such sound, at a position, relative to the display which produces a desired sound quality.

In a second alternate preferred embodiment of the present invention, a speaker mounting device is provided that is especially well configured and adapted for use with flat panel television display units. Although the second alternate preferred embodiment of the present invention is well adapted for use with any flat panel display unit, it is especially well adapted for such display devices having a diagonal viewing screen dimension of 32 inches and greater. More specifically, the second alternate preferred embodiment of the present invention provides, beyond all the adjustment parameters provided by every embodiment of the present invention:

a. a means of remotely operating and locking the pivot joint formed between the proximal terminus of the horizontal extension arm and that portion of the mounting bracket (such as the extension arm mounting tab of the L-shaped bracket) to which it is affixed.) Such remote operation and locking control of this pivot joint enables the horizontal extension arm to rotate about the "Z" axis—as equivalent joint do in all embodiments of the present invention—so as to adjust the roll position (left/right tilt) of a speaker mounted upon the device to a desired position and thereafter lock said joint so as to maintain such position. As discussed above and below, operation of this pivot joint—in all embodiments—also enables the height of said speaker mounted upon the device to be adjusted; and b. a means of remotely operating and locking the sliding of the horizontal receiving arm relative to the horizontal extension arm upon which it is coaxially mounted so as to enable the horizontal receiving arm to be extended or retracted—to a desired position—and thereafter locked into said positions—so as to control the lateral position of a mounted speaker.

The term "means of remotely operating" and "means of remotely actuating" refer to means described, in detail, within this application to those means which are especially configured and adapted to actuate (allow operation and movement of a joint) to provide a desired change in speaker platform position wherein without need to directly manipulate the joint. Such means enable operation (movement) of the subject joint at a point lateral (remote) from the position of the joint actuated. The term "means of remotely locking" refers to the means, described in great detail below, of locking, so as to prevent a specific device joint from moving. Such means enable locking of the subject joint from and at a point along the device which is lateral (remote from the position of the joint being locked. More specifically, the subject means of remotely operating and locking the pivot joint (the pivot joint located at the junction of the extension arm and the L—shaped bracket) and sliding joint (the joint located at the coaxial junction of the horizontal receiving arm and horizontal extension arm) is operated at a point located distal. This provides great additional utility to the present invention in that the afore-mentioned joints—which in other embodiments, are ordinarily located behind a flat panel display—now become easily accessible without need for reaching behind the display. Such utility becomes more readily apparent as the device of the present invention is utilized with larger flat screen displays having a diagonal viewing screen dimension of 32 inches or greater.

The specific configuration of the second alternate preferred embodiment is provided, in great detail, below. It should be noted however that operation of all pivoting, sliding and rotating joints of the present invention—other than the remotely controlled and locked pivoting and sliding joints of the mounting bracket/receiving arm and receiving arm/extension arm—are accomplished by direct manipulation of locking and releasing devices located directly at the joint location. More specifically, and, as described in more detail, below, the second alternate preferred embodiment of the present invention provides for operation and locking of the remaining pivoting, sliding and rotating joints by means of a control wheel, bolt and joint nut and washer(s) which act to tighten (so as to immobilize) and loosen (so as to enable adjustment) of all such other joints. However, these joints are ordinarily very accessible to such operation and locking due to the fact that they are located near or lateral to the lateral edges of the flat screen display to which the device is mounted. In addition, the second alternate embodiment of the present invention is configured, as described above and below to join the proximal end of the extension arm to the mounting bracket (such as the "L" shaped mounting bracket) to form a pivot joint that provides an axis of rotation about the "Z" axis. Because it is the extension arm that is affixed to the bracket, and since the second alternate preferred embodiment encompasses brackets, other that the "L" shaped bracket that can be used to mount a single extension arm for both the right and left sides of the mounting device, the second alternate preferred embodiment comprises at least one horizontal extension arm. More specifically, although the second alternate preferred embodiment may utilize two separate extension arms, configurations utilizing a singe extension arm are indeed contemplated by this embodiment. Therefore, the second alternate embodiment of the present invention comprises at least one mounting bracket especially configured and adapted to align with and enable engagement of said bracket with standardized threaded receiving holes located within a mounting plate incorporated in a back surface of a flat panel display device at least one extension arm, two receiving arms, two pivot arms, two pivot brackets, two sway arms, two intermediate arms, two tertiary arms, two platform arms and two speaker mounting platforms—wherein a pivot joint formed between the horizontal extension arm and the mounting bracket includes a means for remote actuation and remote locking and wherein the sliding joint formed between the at least one extension arm and the two horizontal receiving arms include a means of remote actuation and locking.

Thus, by enabling remote operation of the pivoting extension arm/mounting bracket joint and sliding horizontal receiving/extension arm joint the second alternate preferred embodiment of the present invention enables adjustment of all six speaker position parameters without having to reach behind a flat panel display device. Regardless of the means of operating and/or locking any of the joints utilized in said embodiment, the movement provided thereby is substantially identical to the movement and position control provided by all embodiments of the present invention. As in all embodiments of the present invention, the second alternate preferred embodiment provides the ability to independently set 6 different speaker position parameters.

The speaker mounting apparatus of the present invention is especially configured and adapted to include flat panel mounting holes which align with and enable the apparatus to be affixed to flat panel display utilizing VESA mounting hole configurations and dimensions. Thus, the apparatus of the present invention may be mounted to such displays by means of threaded mounting holes provided in a plate locate in the back panel of such displays in accordance with the aforementioned VESA conventions and standards. The apparatus of the present invention, as described in much greater detail below, can be mounted to such displays via the VESA mounting holes without interfering with, and, in desired, in conjunction with wall, ceiling or pedestal type mounts also affixed to these same VESA mounting holes. Thus, the apparatus of the present invention provides a convenient and reliable means for affixation of the speaker mount to flat panel displays.

DETAILED DESCRIPTION

Figure 1:
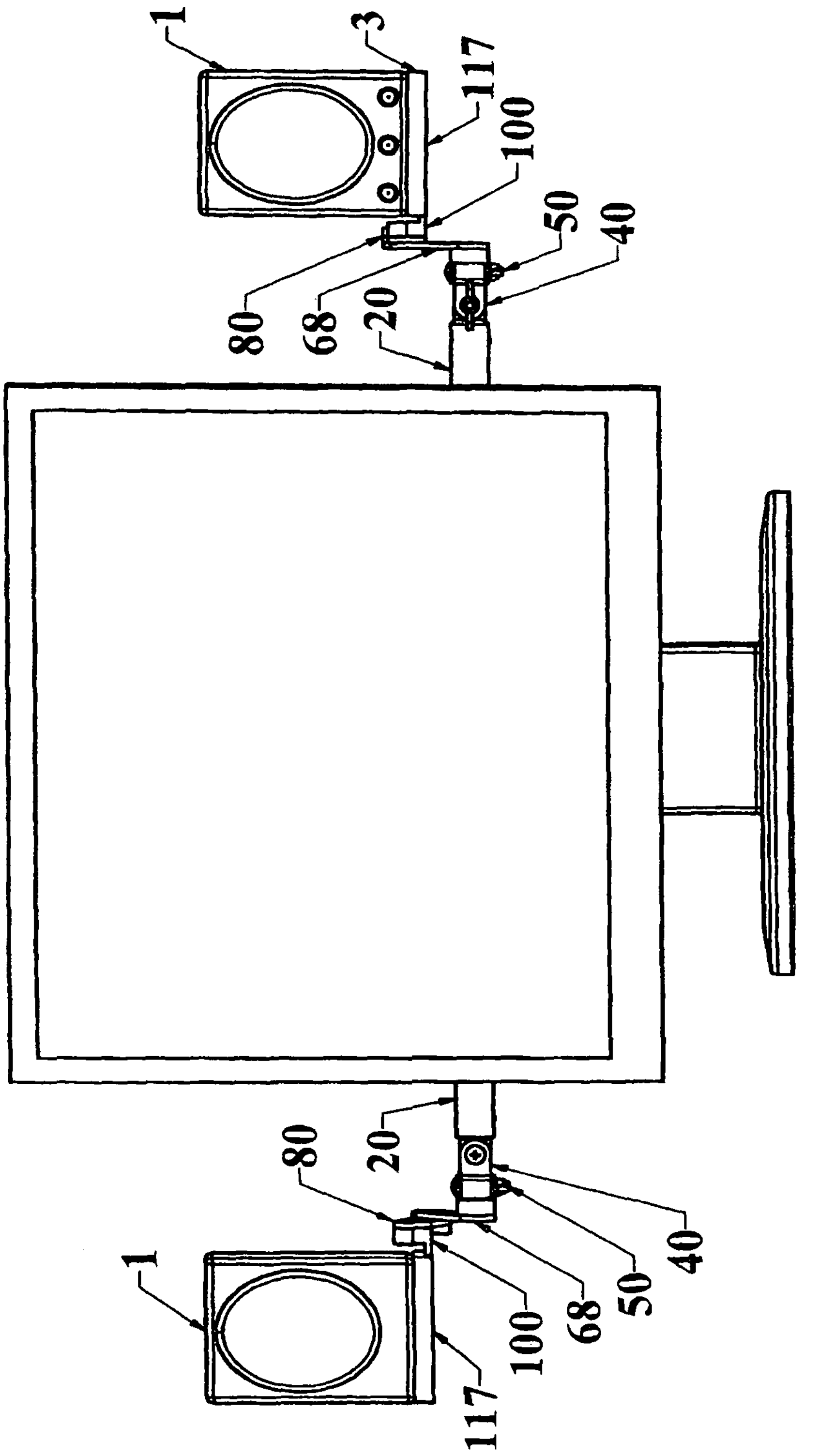
FIG. 1 is a front view of a preferred embodiment of the speaker mounting device of the present invention.
Figure 2:
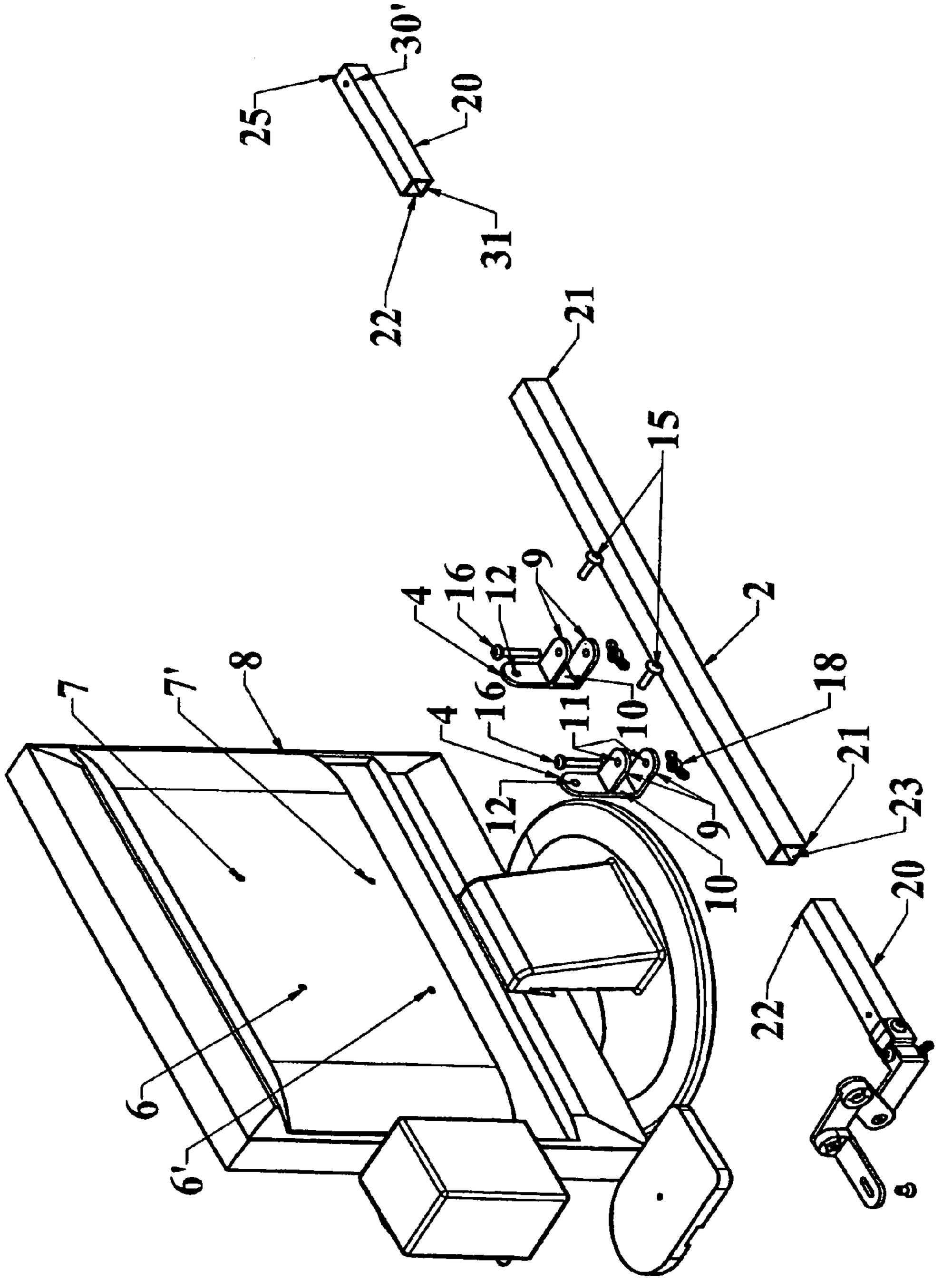
FIG. 2 is a left elevated view of the embodiment illustrated in FIG. 1.

In a first preferred embodiment of the present invention, an apparatus for mounting at least two speakers to a flat panel display device is provided wherein said device may be affixed to a flat panel display utilizing standardized threaded mounting holes provided in said flat panel devices (also known as VESA compliant mounting holes) and wherein the apparatus enables adjustment of the position of each of said at least two speakers relative to the flat panel display in regard to speaker separation, speaker height, speaker depth; inward/outward tilt, upward/downward tilt and left/right cant. The first preferred embodiment of the present invention—as all embodiments thereof—may be utilized in conjunction, or independent of flat panel mounting devices such as, for example, pedestal, wall and ceiling mounts (as discussed above and below.)

The first preferred embodiment of the present invention, as illustrated in FIGS. 1-5, provides an apparatus for mounting at least two speakers to a flat panel display especially configured and adapted for use with flat panel display devices having view screen measurements of from about 12" to 22.9" diagonal, and falling in a weight range up to 30.8 lbs (14 kg). However, the first preferred embodiment may also be utilized with flat panel display devices of greater or lesser dimensions and weights. Due to the fact that the VESA hole pattern for such devices (75 mm×75 mm or 100 mm×100 mm) and fairly diminutive weight enables the use of a flat plate mounting adapter (as opposed to the two piece parallel arm mount described below in connection with larger displays), the first preferred embodiment of the present invention utilizes a single receiving arm 2, mounted via two "F" shaped mounting brackets 4 to at least two receiving holes 6, 6', 7 and 7' located in a mounting plate integrated into the back of a flat panel display monitor 8. The two "F" shaped mounting brackets include an upright mounting arm 10 within which at least one mounting bolt receiving bore 12 is located and two horizontal receiving arms 9. In certain preferred embodiments of the present invention, the upright mounting arm 10 of the "F" shaped bracket 4 has sufficient length to extend past two vertically aligned flat panel mounting holes (examples of which are 6/6' and 7/7') and provide sufficient length thereby to incorporate two receiving bores 12 thereupon which are spaced apart, one from another so as to align with the aforementioned vertically aligned flat panel mounting holes. If the apparatus of the first preferred embodiment of the present invention utilizes an "F" bracket having an upright mounting arm with a reduced length sufficient to enable engagement of one flat panel receiving hole only (usually a lower receiving hole) and the display unit itself is mounted via a wall mount, ceiling mount or pedestal mount apparatus, it is preferable to first align the selected display panel mounting bracket with the aforementioned receiving holes, and thereafter align an "F" shaped bracket—having one receiving bolt only—with a lower receiving hole (6' and 7)' on top (outboard) of the mounting bracket. This configuration, as opposed to placing the "F" shaped bracket underneath the panel mounting apparatus, enables the panel mounting bracket to lie flat against the rear mounting surface of the display device. In those embodiments of the present invention wherein an "F" shaped mounting bracket utilized to mount the receiving arm to the display device includes upright mounting arms having a length sufficient to incorporate two bolt receiving bores (configured to align with two flat panel mounting holes (e.g. 6 and 6')), it is preferable to mount the "F" shaped bracket between the wall, ceiling or pedestal mount and the back panel of the display device. Such a configuration allows the "F" shaped bracket to be more securely affixed to the flat panel mounting plate and lie flat against the back panel of the display device. In this configuration, the upright arms form a surface enabling the panel mounting apparatus to lie flat against the "F" shaped brackets. In either instance, a machine bolt 15 passing through the bolt receiving bore 12 of the "F" shaped bracket 4 (as well as the receiving hole of any flat panel device mount aligned with the mounting holes of the flat panel device) and thereafter threaded into a bolt receiving holes of the flat panel device (6, 6' 7 and 7') secures the "F" shaped bracket to the flat panel device (as well as securing any panel mounting device mounted to the device.

The "F" shaped brackets are advantageously constructed of a rigid and durable materials such as, for example, a metal material such as, for example, aluminum, an aluminum alloy or steel (and steel alloys). However, the "F" shaped brackets may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

Each of the two horizontal receiving arm arms 9 include vertically aligned bolt receiving bores 11. The distance between the two horizontal receiving arm arms is especially configured to enable capture therebetween of the receiving arm 2. In addition, the receiving bores 11 within the horizontal arms are located in such a position so that when the receiving arm is captured within the horizontal arm arms of the "F" shaped bracket, and bolt 16 is placed through the two receiving holes and affixed therein by means of wingnut 18, the receiving arm is held firmly in place.

The horizontal receiving arm is advantageously configured as a hollow arm having a square or rectangular cross section and two open termini 21. The receiving arm includes a channel 23 therewithin especially shaped and configured to slidably receive extension arms described in more detail, below. Utilizing such a cross sectional shape stabilizes the extension arms against rotation. The extension arm is configured to have the same cross sectional shape as the horizontal receiving but defines a more diminutive cross sectional area so as to allow the extension arm 20 to fit and slide within the channel 21 of the receiving arm, as discussed in more detail, below. The extension arm includes a proximal 22 and distal 25 termini which are open. The proximal end 22 of the extension arm is fitted and placed within one of the open termini 21 of the horizontal receiving arm. Each extension arm may be extended from or retracted back within the horizontal receiving arm. In this manner, the position of speakers, mounted upon the device platform, may be adjusted in regard to movement towards or away from the flat panel display device and, of course, each speaker from the other. Thus, for example, two speakers placed upon the platforms, may be drawn away from the display—in order to obtain greater physical as well as stereo separation—or moved closer towards each other and the display. Alternatively, the distance between each speaker and the panel may be independently adjusted in certain instances where such is necessary. For example, a physical obstruction may require one speaker to be closer to the display than the other. The movement provided by the movement of the extension arm within the horizontal receiving arm is, of course, movement which is parallel to the base of the flat surface of the flat screen display and also aligned with the receiving arm, which is, as its name implies, horizontally mounted to the display.

The horizontal receiving and extension arms are advantageously constructed of a rigid and durable materials such as, for example, a metal material such as, for example, aluminum, an aluminum alloy or steel (and steel alloys). However, these arms may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

A pivot arm 28 is especially configured and adapted for insertion within a channel 31 defined by the walls of the extension arm adjacent to the distal termini of said arm. The pivot arm is shaped and configured to include, at a proximal portion thereof, an insert section 27 which defines the same cross sectional shape as the extension arm (e.g. rectangular or square) but of a lesser outside dimension so as to enable the insert section of the pivot arm to be inserted within the channel located adjacent to the distal portion 25 of the extension arm. The distal portion of the pivot arm is shaped as a curved portion 39 having an outside radius of about 180 degrees. A pivot bolt receiving hole 33 located at the central axis of said radius. The curved distal portion of the pivot arm enables, as described in greater detail below, adjustment of the position of a speaker mounted upon the platform of said apparatus in regard to deviation from vertical alignment, or as it may also be described, rotation about an “Z” axis or change in roll position (adjustment in left and right cant.)

At the proximal insert portion of the pivot arm, a lock pin bore 30 is provided, which is especially positioned to align with a lock pin bore 30' located proximal to the distal termini of the extension arms. The aforementioned bores align when the proximal insert portion of the pivot arm is fully inserted within the distal portion of the extension arm. Two lock pins 34 extend outward from bore 30 by spring 25 and effectively align with bore 30' (located on both the superior and inferior surface of the extension arm, adjacent the distal terminus thereof) when said alignment is accomplished. The extension of the lock pins effectively affixes the pivot arm within the channel defined by the extension arm adjacent to the distal termini thereof.

As discussed above, a pivot bolt receiving bore 33 is provided at the central axis of the curved distal portion 39 of the pivot arm. A pivot bracket 40 is provided for articulation with the pivot arm. The pivot bracket includes, at a proximal portion thereof, two parallel extension tabs 38 having a distance therebetween especially configured and adapted for receipt of the curved portion of the curved portion of the pivot arm therebetween. The distal portion of the pivot bracket defines a vertically disposed barrel shaped section 46 defining a radial curve of about 270 degrees. Located at a central axis of the radial curve is a sway arm receiving bolt bore 48 which enables, as described in greater detail below, pivotal affixation (enabling rotation) of the pivot bracket to a sway arm 50 positioned distal thereto.

Each of the parallel extension tabs 38 of the pivot bracket 40 includes a pivot bolt receiving hole 41 located proximal to the termini thereof which align,—when the curved portion of the pivot arm is placed between the confines of the two extension tabs—and aligned with the pivot bolt receiving hole 33 of the pivot arm—. A pivot bolt 42 inserted through said pivot bolt receiving holes of the pivot bracket and arm—and retained in position by a wing nut 44—effectively affixes the pivot arm to the pivot bracket while enabling pivotal movement therebetween.

Figure 6:
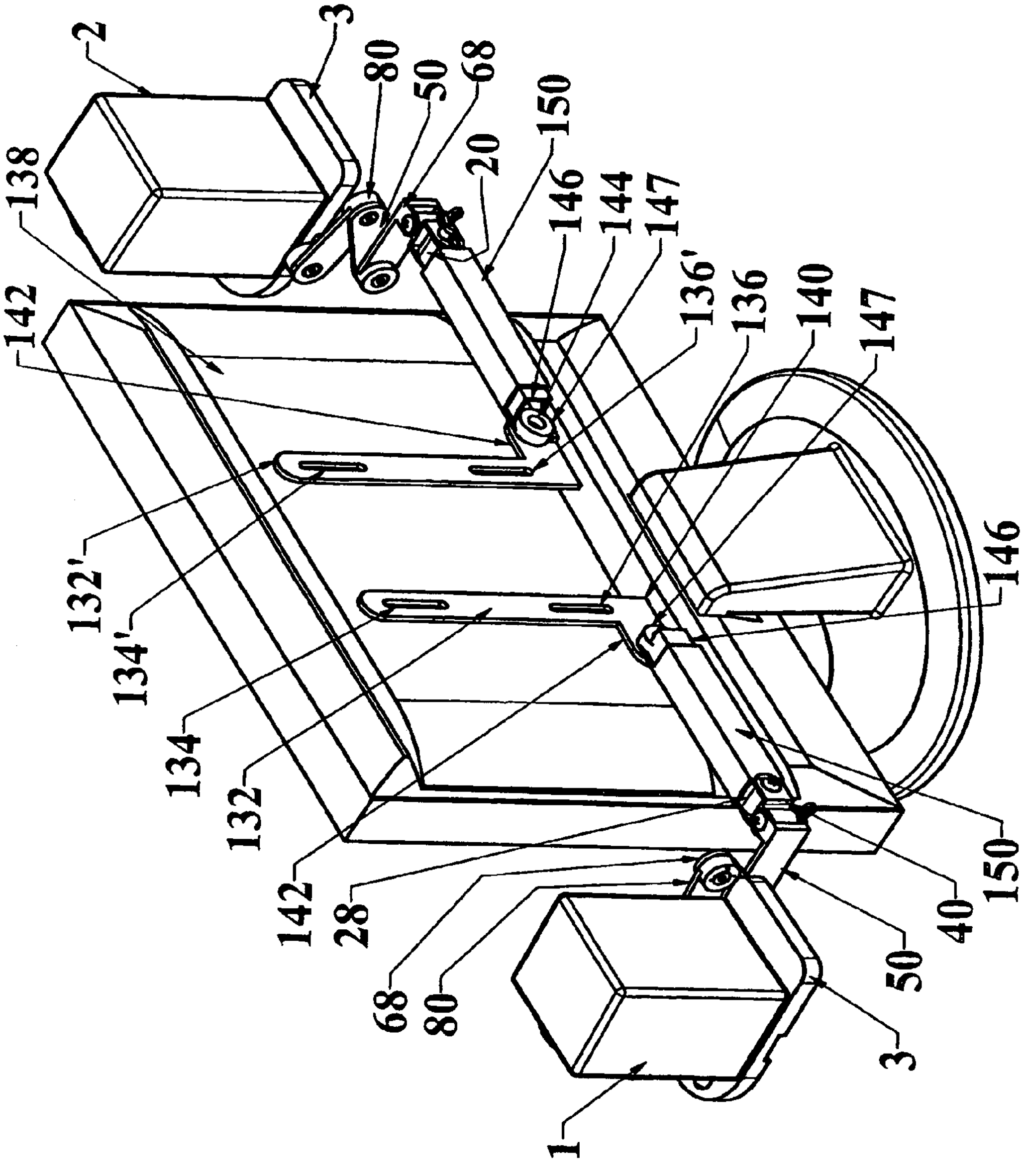
FIG. 6 is a rear isometric view of an alternate preferred embodiment of the present invention.

As described above and below, the pivotal (rotational) movement of the pivot arm in relation to the pivot bracket—forming the pivot arm/pivot bracket joint—enables left/right canting of a speaker 1 mounted upon the below described platform 3 in regard to a flat screen display device upon which the apparatus is mounted. Or, as the movement may also be described, the pivot arm/pivot bracket joint enables rotation of the platform, and a speaker mounted thereupon, about the “Z” axis or a change in roll position. The pivot arm/pivot bracket movement 202 is illustrated in FIG. 6. The Z axis 203 passing through the joint and aligned with bolt 42 form the axis of rotation and would like roughly parallel with a Z axis perpendicular to and passing through the center of the flat panel display.

As utilized throughout this specification and within the claims, movement of speaker platform and, of course, a speaker mounted thereupon, is described utilizing the Cartesian coordinate system which utilizes an “X”, “Y” and “Z” axis to locate any point in space as well as to describe movement along, for example, an arc. The planar surface formed by the front of a flat screen display panel is utilized as a reference plane so as to form a hypothetical origin point, located on the outer surface of the display screen, and at the midpoint of the height and width thereof. This point is referenced herein as the origin of the X, Y and Z axis. The X axis may therefore be described as a line running horizontally along the panel, passing through the origin at a center point of the panel and running along the panel at what may be described as mid-panel height, effectively dividing the panel in an equal upper and lower portion. The Y axis may be described as a hypothetical line running vertically, through the origin, effectively dividing the panel in a equal right and left section. The Z axis may be described as a hypothetical line running perpendicular to the planar surface of the flat screen display panel and, of course, also passing through the origin point located in the middle of the panel. Of course the origin of speaker movement does not overlies and correspond to the display screen but rather originates in the center of the joint producing the described movement. Thus, while speaker movements (especially rotation about the X, Y, and Z axis) are best described with reference to the flat monitor screen, the arc of all such rotational movements originate in the actual joint enabling such movement. These joint movements, and the axis of rotation thereof, are shown in FIG. 6.

The sway arm 50 includes a proximal portion having two parallel extension tabs 52 extending therefrom. The distal portion of each of the said extension tabs includes, at a distal portion thereof, a curved portion defining a radius of about 180 degrees. The distance between the two parallel extension tabs is especially configured and adapted for close receipt of the barrel shaped portion 46 of the pivot bracket. Each of the parallel extension tabs of the sway arm includes, at a central portion thereof corresponding to the axis of said radius, a sway arm bolt receiving hole 53. This receiving hole is especially positioned and configured for alignment with the sway arm bolt receiving hole 48 located centrally within the barrel shaped portion of the pivot bracket—when the barrel shaped portion it is captured within the area defined by the extension tabs of the sway arms—. A sway arm bolt 54 passing through the each of the aforementioned sway arm bolt receiving holes is affixed in placed via wingnut 56 so as pivotally affix the pivot bracket to the extension tab. The pivotal motion provided by the aforementioned movement 204 of the sway arm/pivot bracket joint enables the position of a speaker, mounted upon the platform of the device of the present invention, to be tilted inboard and outboard relative to a flat screen display upon which the device is mounted. Movement of this joint may also be described as rotation of speaker position relative to the "Y" axis 205 of the sway arm/pivot bracket joint or changes in yaw angle. (See FIG. 5)

The sway arm 50 includes, at a distal portion thereof, a curved disc section 58 having a radial curve of about 360 degrees. At the radial axis of the radial curve, a retaining bolt bore 51 is formed. An outwardly disposed portion 61 (outer face) of the curved section of the distal portion of the sway arm includes four position locating ball receiving bores. Each such receiving bores contains therewithin, an extension spring 62 and a positioning ball 64 which is biased outward from said receiving bore by said spring.

The outer face of the sway arm is aligned with and affixed to a proximal portion 66 of intermediate arm 68. The proximal portion of the intermediate arm is formed as a radial curve 72 having an inside face 71 and an outside face. At the radial axis of the radial curve of the proximal end of the intermediate arm, a retaining bolt bore 74 is formed to receive retaining bolt 67 which passes through both bore 74 and the retaining bolt bore 51 formed on the distal portion of the sway arm 50. Upon threading of nut 77 thereupon—to effectively affix the sway arm to the intermediate arm, a sway arm/intermediate arm joint is formed is such a manner as to allow said joint to rotate 206 (pivot) as described below an illustrated in FIG. 6.

Figure 3:
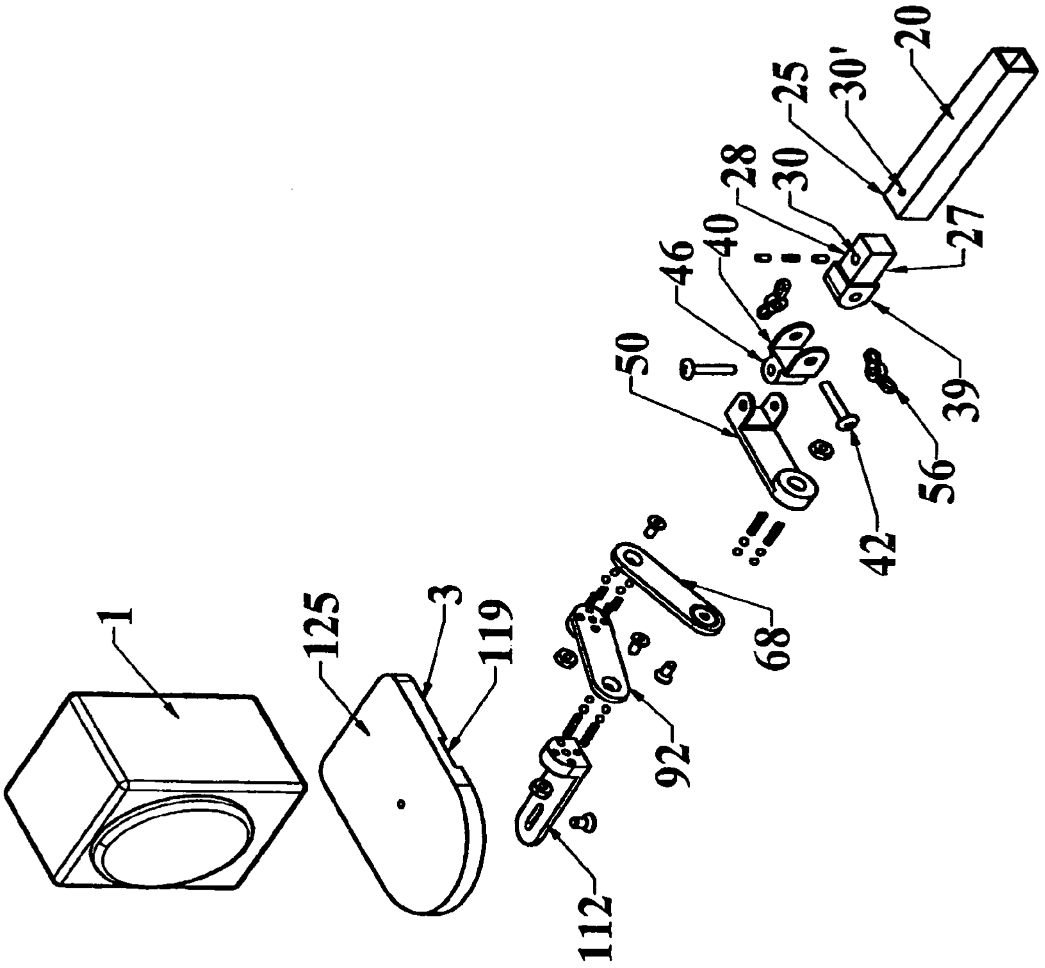
FIG. 3 is an isometric exploded view of a portion of the embodiment illustrated in FIG. 2.
Figure 3A:
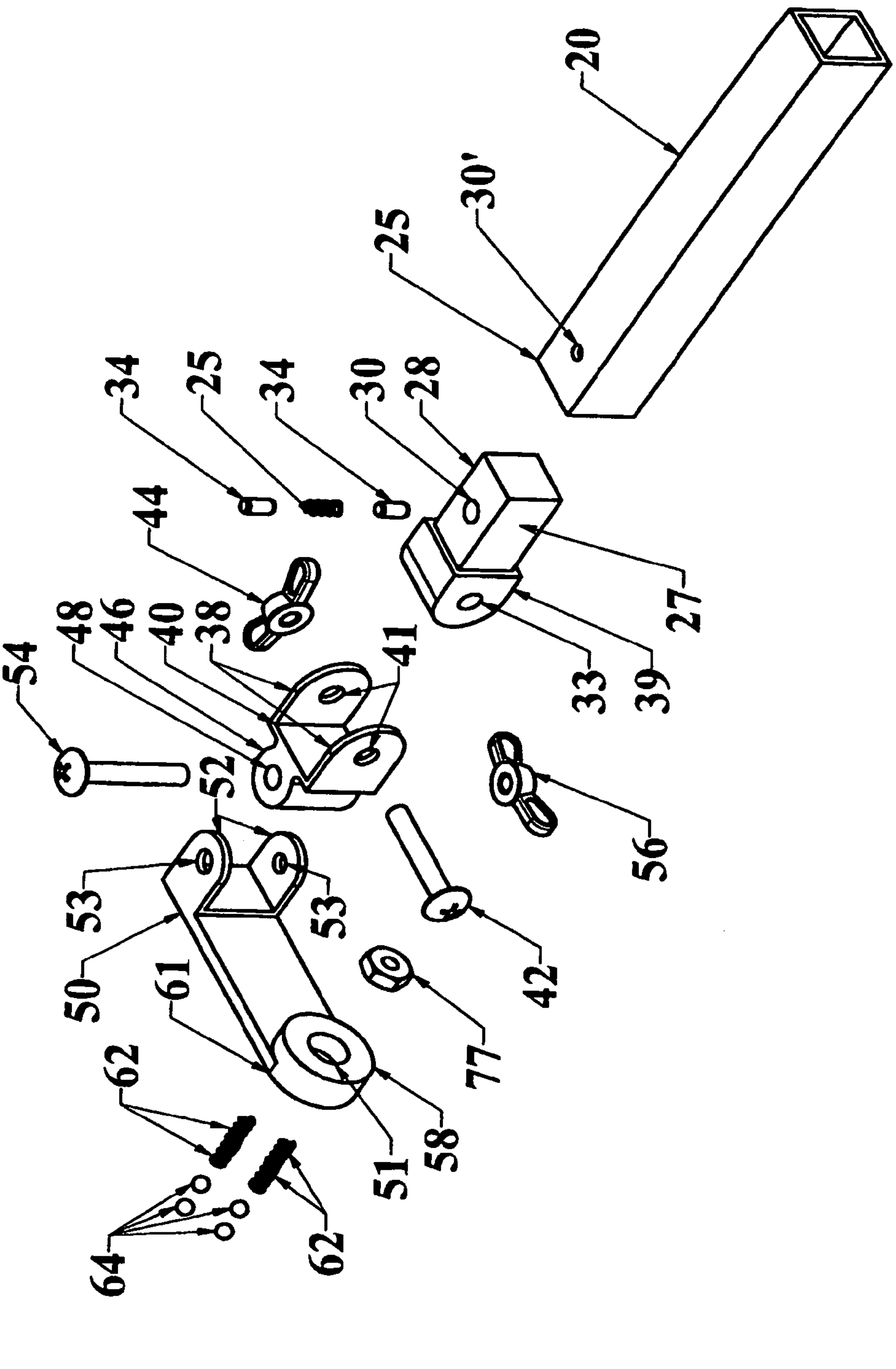
FIG. 3*a* is a sectional view of the exploded view shown in FIG. 3.
Figure 3B:
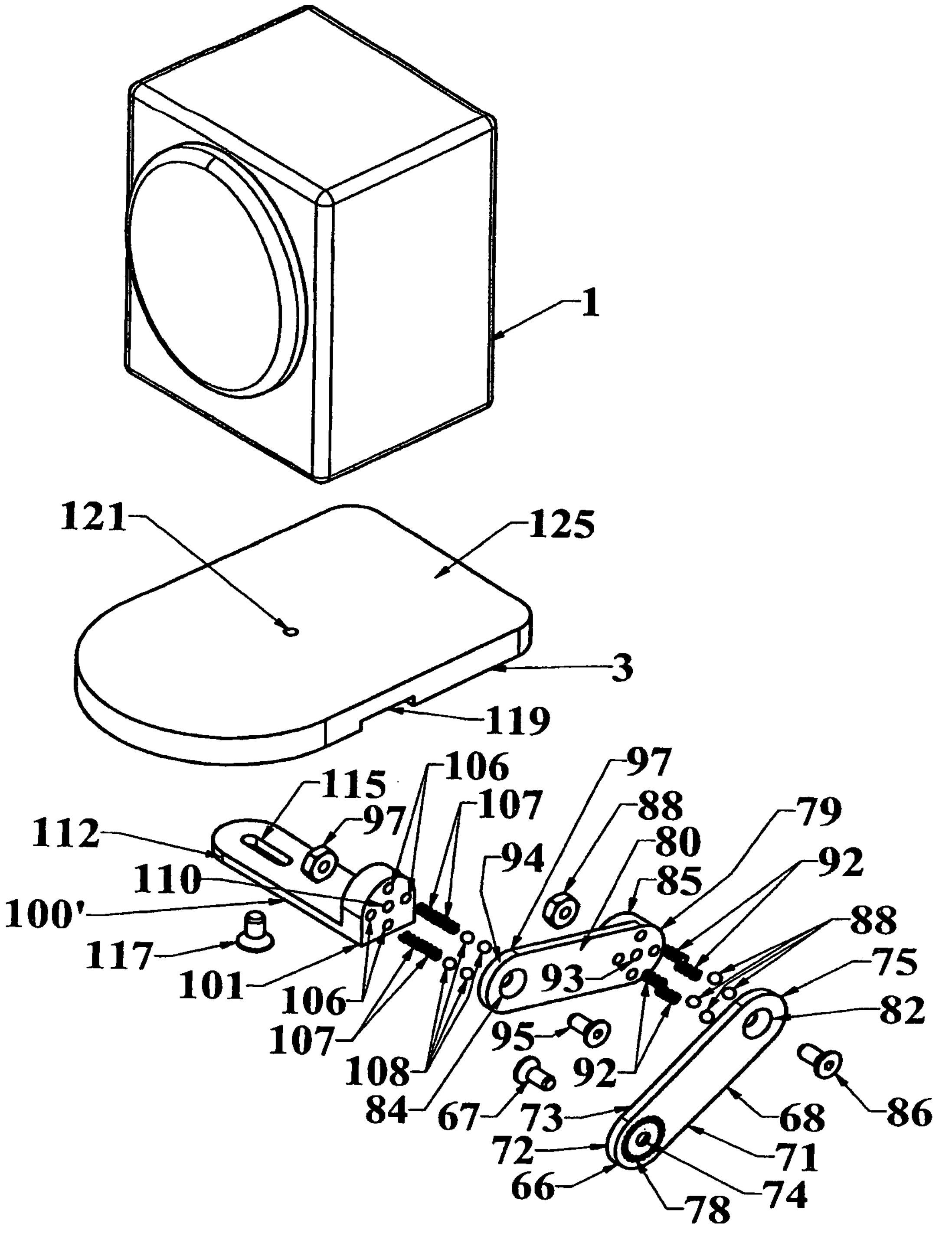
FIG. 3*b* is an additional sectional view of the exploded view illustrated in FIG. 3.
Figure 3C:
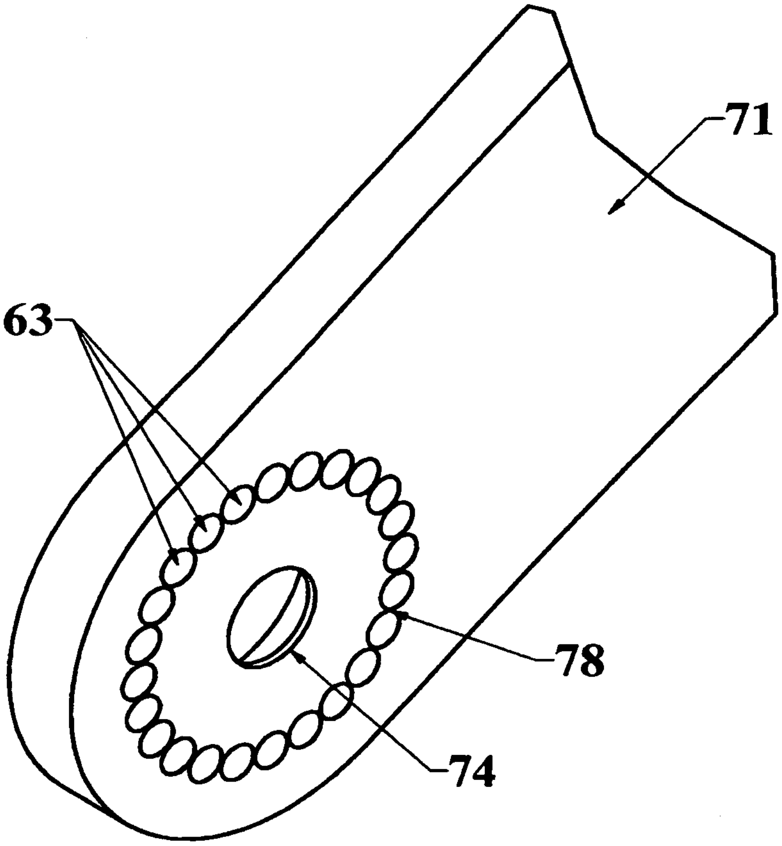
FIG. 3*c* is a detail view of the distal portion of intermediate arm 71 shown in FIGS. 3*a* and 3*b*.
Figure 4:
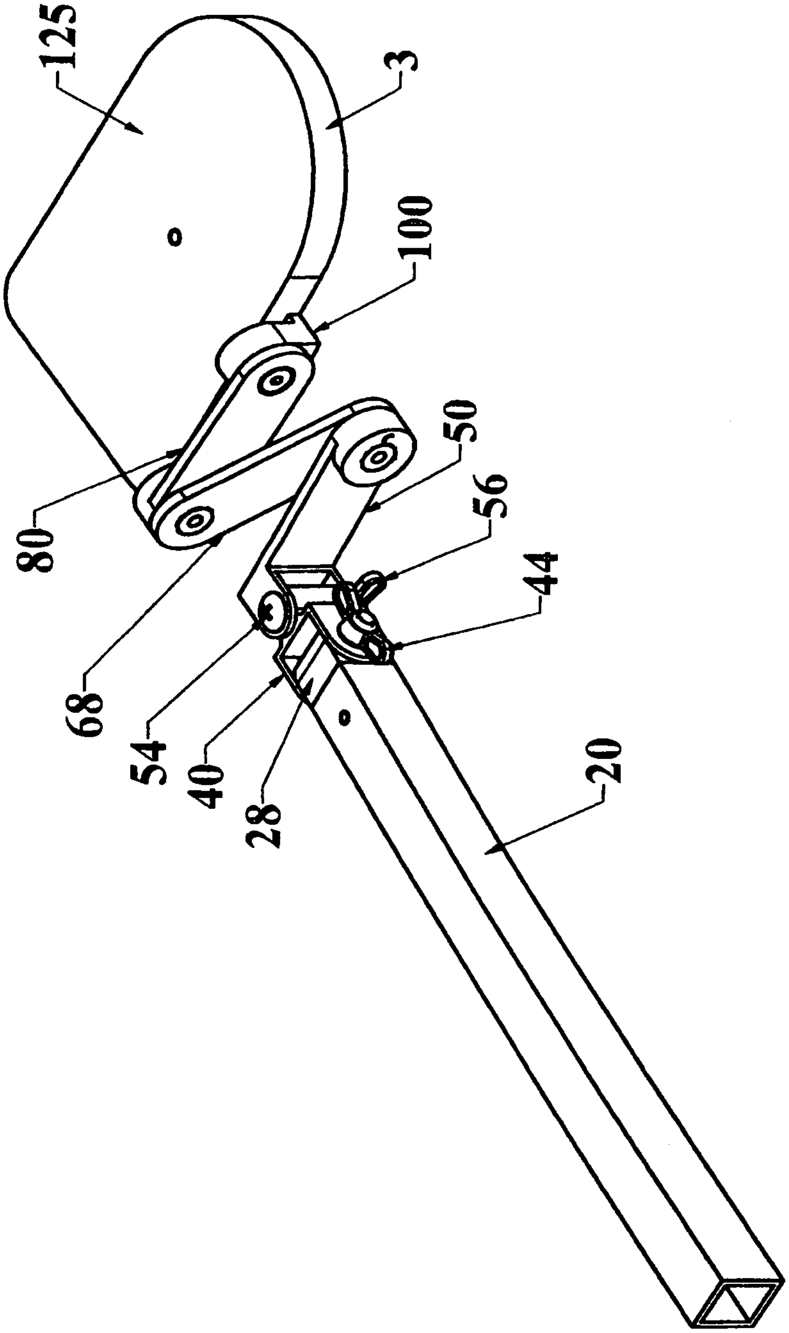
FIG. 4 is an additional section view of FIG. 3

Circumferentially disposed about the retaining bolt bore 74—on the inner face 71 of the proximal terminus of the intermediate arm—, (shown in detail in FIG. 3*c*) a positioning groove 78 is formed with the curved disc section. The positioning groove is configured as a groove formed of circular depressions having substantially the same diameter as the positioning balls and having a depth less than one half the diameter of the positioning balls. The positioning groove is formed and located upon the inner face of the proximal end of the intermediate arm is such a manner so that, when the intermediate arm and sway arm are affixed together via the aforementioned bolt and wingnut, as described immediately above—a pivot arm/intermediate arm joint is formed wherein:

1. The intermediate arm is capable of pivotal movement relative to the sway arm; and 2. The positioning balls 64, located within the retaining bores of the sway arm provide positive pivotal "stops" as the balls, urged outward by the extension springs 62 enter into and engage the circular depressions 63 comprising the positioning groove.

Thus, the intermediate arm/sway arm joint provides pivotal movement wherein the circular depressions comprising the positioning groove 78 acts to provide positive detents for accurate positioning. The pivoting movement of the sway arm relative to the intermediate arm—in the absence of movement of any of the aforementioned, or below described joints—enables the position of a speaker 1 affixed to platform 3 to be adjusted in regard to an upward/downward arc which may also be described as adjustment to speaker pitch angle. This movement can also be described as enabling the platform, and the speaker there upon to be rotated about the "X" axis. The motion 206 of the sway arm/intermediate arm joint is centered upon axis 207 shown in FIG. 5. Movement of sway arm/intermediate arm joint in combination with movement of the below-described intermediate arm/tertiary arm enables the position of a speaker mounted upon platform 3 to be adjusted in regard to height (or as it may also be described, movement upon and down the "Y" axis)—without necessarily changing the upward/downward inclination (rotation about the "X" axis) of the speaker mounted thereon. However, although adjustment of both the intermediate arm/tertiary arm joint in combination with the sway arm/intermediate arm enables adjustment of speaker height while enabling such adjustment to be accomplished without disturbing the upward/downward tilt of a speaker. However, such movement will alter the depth (or as it may also be described, fore/aft) position of the speaker relative the flat screen display (movement forward and rearward along the "Z" axis). For example, if one desires to increase the relative height of speaker 1 mounted upon platform 3 while keeping the broad top surface of the platform (and thus the speaker mounted thereupon) perpendicular to the display screen, the relative depth of the speaker (and platform will necessarily change during such adjustments). For example, adjustment of these two joints in view of obtaining the greatest speaker height, while keeping the top surface of the platform perpendicular to the display screen may cause the speaker position to move rearward, towards behind the flat screen display. In order to enable the device of the present invention to adjust speaker height relative to the display device without:

1. Changing the upward/downward tilt of the speaker (pitch); and

2. Without changing the fore/aft position (movement along the "Z" axis) of a speaker so adjusted, the sway arm/intermediate arm, intermediate arm/tertiary arm and the below described tertiary arm/platform arm must all be adjusted. Thus, the device of the present invention does enable the height of a speaker mounted to a flat screen display device thereby to be adjusted, without disturbing the position of the speaker so adjusted in regard to upward/downward tilt (pitch angle or rotation about the "X" axis), or the fore/aft position of the speaker (movement along the "Z" axis), relative to the flat screen display.

Figure 5:
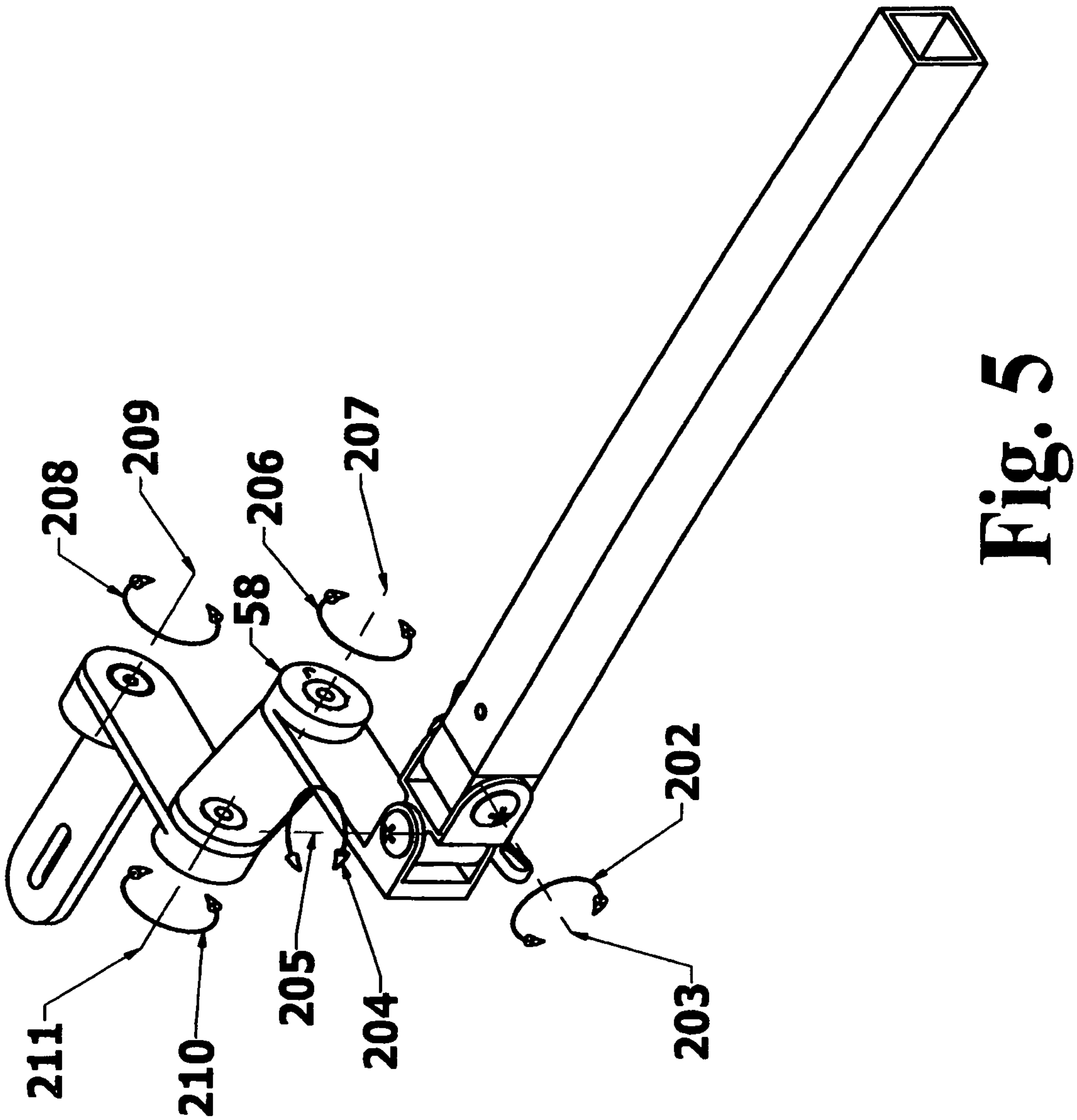
FIG. 5 is a section view of the device illustrated in FIG. 3.

The intermediate arm 68 articulates, at the distal terminus 75 thereof, with the proximal terminus 79 of tertiary arm 80. Both the distal terminus of the intermediate arm and the proximal terminus of the tertiary arm are formed in the shape of curve having a radius of about 180 degrees. However, extending from an outer face, near the proximal terminus 79 of the tertiary arm, a disc portion 85 extends. The disc portion provides, as it does in regard to the disc portion 58 located at the distal terminus of sway arm 50, sufficient material thickness to enable the retention of extension springs and positioning balls housed therein. A retaining bolt bore 82 and 93 is formed in the center of both the distal portion of the intermediate arm and at the proximal curved section of the tertiary arm—at the radial axis thereof and is utilized, as discussed in more detail below, to receive retaining bolt 86 which, in conjunction with nut 88 enables the formation of a rotating (or as it may also be described, pivoting) tertiary arm/intermediate arm joint. As described above, the positioning groove is configured as a groove formed of circular depressions having substantially the same diameter as the positioning balls and having a depth less than one half the diameter of the positioning balls, discussed below. It is advantageous that the diameter of the holes comprising the groove should not be greater than the diameter of the positioning balls themselves so as to avoid excessive "play" which would result in an absence of precise seating of the balls within the groove. The positioning groove is formed and located upon the outer face of the distal end of the intermediate arm in such a manner so that, when the intermediate arm and tertiary arm are affixed together, as described immediately above—, positioning balls 88 located within ball retaining bores of the inner face of the tertiary arm are urged outward by the extension springs 92 so as to provide positive "click" positioning of the intermediate arm relative to the tertiary arm. Thus, the ring of circular depressions comprising the positioning groove acts to provide positive detents for accurate positioning. Articulation of the joint formed by the distal end of the intermediate arm and the proximal end of the tertiary arm provides enables a speaker mounted upon platform 3 to be adjusted in regard to upward and downward tilt (pitch or rotation about the "X" axis). The motion 210 provided by rotation of this joint about axis 211 is illustrated in FIG. 5. However, articulation of the sway arm/intermediate arm in combination with articulation of the intermediate arm/tertiary arm joint enables one to adjust the relative height of a speaker mounted upon the apparatus while either maintaining or changing the upward, downward tilt of the speaker as desired.

The distal portion 94 of the tertiary arm defines a curve having a radius of about 180 degrees. A retaining bolt bore 84 is located in the distal portion of the tertiary arm at the radial axis of said curve. The retaining bolt bore, when aligned with the retaining bolt bore 110 located at the proximal terminus 101 of the platform arm 100, allows retaining bolt 95 to pass through both bores, and threadingly engage nut 97 to form a tertiary arm/platform arm joint. A positioning groove is located, circumferentially about the retaining bolt bore 84 on the outer face 97 at the distal portion 94 of the tertiary arm.

The positioning groove is formed and located upon the outer face of the distal end of the tertiary arm in the same manner as discussed above in regard to the positioning groove formed near the distal portion of the intermediate arm. The groove functions in such a manner so that, when the tertiary arm and platform arm 100 are affixed together via bolt 95 and nut 97, as described immediately above—, positioning balls 108 located within ball retaining bores 106 formed upon and within the inner face of the proximal portion 101 of the platform arm are urged outward by the extension springs 107 so as to provide positive "click" (detent) positioning of the tertiary arm relative to the platform arm. Thus, a ring of circular depressions comprising the positioning groove, which is formed as described above in regard to the positioning groove located at the proximal terminus of the intermediate arm, acts to provide positive detents for accurate positioning of the tertiary arm/platform arm joint. Articulation of this joint, in the absence of articulation of the aforementioned joints, enables one to tilt a speak mounted upon platform 3 upward or downward (change the pitch or provide movement about the "X" axis). Rotation 208 of this joint and the axis of motion thereof 209 is illustrated in FIG. 5. However, movement of the tertiary arm/platform arm joint in conjunction with the tertiary arm/intermediate arm joint enables one to adjust the height of a speak mounted upon the speaker platform—without altering the upward downward tilt of the speaker—. However, such movement will also change the relative depth position of the speaker relative to the flat screen panel. This is to say, such double joint manipulation will, in addition to enabling movement of the speaker up and down (height adjustment which may also be described as movement up and down the "Y" axis) will also cause the speaker to move forward and backward relative to a plane formed by the flat panel display (movement along the "Z" axis). Articulation of the platform arm/tertiary arm and the tertiary arm/intermediate arm and the sway arm intermediate arm joint enables one to adjust the height of a speaker mounted upon the platform without (if desired) changing the relative depth or upward/downward tilt of the speaker.

Rotation of any of the aforementioned sway arm/intermediate arm, intermediate arm/tertiary arm or tertiary arm/platform arm joints can be described as rotation about the X axis. Such rotation changes the upward/downward cant of a speaker mounted upon the platform but, also, of course, will necessarily change the height and depth position of the speaker as well. In order to select just one parameter to be changed amongst these three positions, while maintaining the other two, all three joints must be manipulated The platform arm includes a tab extension 112 located at a distal portion thereof. The tab extension includes, a platform mounting bolt groove 115 formed therewithin for receipt of a platform mounting bolt 117. A bottom surface of speaker platform 3 advantageously includes a tab recess 119 having a length, width and depth enabling said tab extension to fit therewith. Upon alignment of the tab within the recess, a mounting bolt receiving bore 121 formed within the speaker platform enables platform mounting bolt 117 to affix the speaker platform to the platform arm. Platform mounting bolt 117 may be selected to demonstrate a length and configuration sufficient to engage the platform, extend through the superior planar surface 125 thereof and engage a bolt receiving bore prepared within the bottom surface of speaker 1. Alternatively, double sided tape, hook and loop fastening material, adhesive materials or putty may be utilized to affix the speaker to the superior planar surface of the platform.

The pivot arm, pivot bracket, sway arm, intermediate, tertiary and platform arm, as well as the speaker platform are advantageously constructed of a rigid and durable materials such as, for example, a metal material such as, for example, aluminum, an aluminum alloy or steel (and steel alloys). However, all of these components may also be fabricated from plastic materials such as polycarbonate, polyester and polyvinyl plastics. However, it is most advantageous to utilize a plastic demonstrating maximum strength and rigidity such as, for example, reinforced plastics including, but not limited to composite plastics (e.g. graphite filled plastic material) fiberglass and cured plastics utilizing filled resin materials.

The extension springs are advantageously fabricated from a high quality spring steel. As is well known to the art, spring steel is a low alloy, medium carbon steel used in springs because it has a higher elastic modulus compared to other steels. Silicon is a key component to most spring steel alloys.

It is also advantageous to fabricate the above-described positioning balls and lock pins from a steel or steel alloy material so as to achieve the strength and sheer resistance required from such components.

The present invention provides, in an alternate preferred embodiment thereof illustrated in FIG. 6, a speaker mounting apparatus especially configured and adapted for flat panel display devices which utilize a wall, ceiling or pedestal mount comprised of two vertical, box like channels which are affixed to the back of such devices utilizing VESA mounting holes. In such instances, the two vertical device mounting channels, which are often utilized to mount larger (display sizes greater than 23 inches measured diagonally) would make difficult the use of the first preferred embodiments, described above. More specifically, the first preferred embodiment of the present invention utilizes a receiving arm which is a one piece unit and which, by reason of such configuration, poses more difficulties in regard to interference with the aforementioned panel mounts utilizing vertical channel mounts. Such vertical channels pose as obstruction and would, in certain instances, block placement of the receiving arm unless, for example, an elongated vertical section of the “F” brackets was utilized to place the horizontal receiving arm well under the inferior extent of the vertical channel mounts. Therefore, the alternate preferred embodiment of the present invention utilizes two separate compact receiving arms 146 & 146' instead of a single receiving arm. As shown in FIG. 6 the alternate preferred embodiment utilizes to flat L-shaped mounting arms 132 & 132' which each include 2 panel bolt receiving slots 134, 134', 136 and 136' as a means of affixing the apparatus to the back of flat panel display device 138. The flat L-shaped mounting arms are especially formed and configured so that the aforementioned receiving slots will align with the standardized VESA bolt receiving plates, and the threaded bolt receiving bores formed therein, located on the majority of such devices. The two L-shaped brackets and the flat configuration thereof, in combination with the use of two separate receiving arms, enable the speaker mounting apparatus of the alternate preferred embodiment of the present invention to be mounted underneath or external to vertical channel mounting devices utilized to mount such display devices to walls, ceilings or, in some instances, at part of pedestal mounts.

Each of the L-shaped arms includes, at an inferior terminus 140 thereof, a receiving arm mounting tab 142. Each such, in turn, includes a mounting bolt bore. A receiving arm 146, shaped as a hollow, square or rectangular channel, also includes, near the proximal terminus thereof, a disc-like mounting ring 147 which includes, at its radial axis, a bolt receiving bore 144. The mounting bolt bores located near the inferior terminus of the L-shaped mounting arms and the proximal end of the receiving arms are especially configured and formed so as to allow them to align, one with the other and to enable placement of a nut and bolt therethrough so as to form an “L” shaped mounting arm/receiving arm joint. This joint enables roll position adjustment of a speaker 1 mounted upon platform (which may also be described as a rotation about the “Z” axis). The axis is located however coaxially with receiving bore 144 so rotation occurs about this axis allowing the speaker to rise and fall in an arc with an axis aligned with the bolt which is threaded through bore 144 thus providing adjustment of speaker height position.

An extension arm 150 is also formed as a hollow rectangular channel but of such a dimension so as to allow the extension arm to fit coaxially about each of the receiving arms 146 so as to allow the extension arm to slide inwards (towards the display, and outwards, away from the display thereby allowing selection of desired speaker separation of speakers mounted upon platforms 3.

As described above in regard to the first preferred embodiment, a pivot arm 28 is especially configured and adapted for affixation to the distal portion of the extension arm. The pivot arm is affixed to a pivot bracket 40 and the joint formed therebetween enables the same platform/speaker positioning and movement as discussed above in regard to the first preferred embodiment.

The pivot bracket is, in turn, affixed to a sway arm 50 in the same manner as discussed above and forms an identical pivot arm/sway arm joint which, in turn provides the same speaker/platform positioning functions as it does in regard to the first preferred embodiment.

The sway arm is, in turn, affixed to the intermediate arm 68 in the same manner as discussed above and forms an identical sway arm/pivot arm joint which, in turn provides the same speaker/platform positioning functions as it does in regard to the first preferred embodiment.

The intermediate arm is, in turn, affixed to the tertiary arm 80 in the same manner as discussed above and forms an identical intermediate arm/tertiary arm joint which, in turn provides the same speaker/platform positioning functions as it does in regard to the first preferred embodiment.

The tertiary arm is, in turn, affixed to the platform arm 100 in the same manner as discussed above and forms an identical tertiary arm/platform arm joint which, in turn provides the same speaker/platform positioning functions as it does in regard to the first preferred embodiment.

Although the alternate preferred embodiment of the present invention provides the same full range of speaker positioning as does the first preferred embodiment, it enable mounting of the device in situations where vertical channel mounts utilized to mount a flat panel device would obviate use of the first preferred embodiment of the present invention.

In a second alternate preferred embodiment of the present invention, a speaker mounting device is provided that is especially well configured and adapted for use with flat panel television displays. Although the second alternate preferred embodiment of the present invention is well adapted for use with any flat panel display unit, it is especially well adapted for such display devices having a diagonal viewing screen dimension of 32 inches and greater.

More specifically, the second alternate preferred embodiment of the present invention additionally provides a means for remotely operating and locking the pivot joint formed between the proximal terminus of the horizontal extension arm and that portion of the mounting bracket (such as the horizontal extension arm mounting tab) with which the extension arm articulates and forms a pivot joint. This joint functions and provides the same control of speaker position as provided by all other embodiments of the present invention wherein the horizontal receiving arm—and not the extension arm—articulates with the mounting bracket affixed to the back panel of a display device. Such operation and locking control of this pivot joint enables the horizontal extension arm (and the horizontal receiving arm mounted thereabout, to rotate about the “Z” axis so as to adjust the roll position (left/right tilt) of a speaker mounted upon the device to a desired position and thereafter lock said joint so as to maintain such position. As discussed above and below, operation of this pivot joint also enable the height of said speaker mounted upon the device to be adjusted. The remote operation of this joint enables one to release the joint—so as to enable movement—by grasping the horizontal receiving tube near its distal terminus—a substantial distance away from the joint being released and operated. Likewise the remote locking of this joint enables one to lock the joint in a desired position by releasing the horizontal receiving arm at a point near its distal terminus and remote from the joint being locked.

The second alternate preferred embodiment of the present invention also provides a means of remotely operating and locking the sliding joint formed between the outside surface of the horizontal extension arm and the inside surface of the horizontal receiving arm. More specifically, this embodiment provides a means of remotely enabling sliding of the horizontal receiving arm along the horizontal extension arm so as to enable the horizontal receiving arm to be extended or retracted—to a desired position—so as, in turn, to adjust speaker platform position in regard to lateral position. The remote means also provides for the locking of this sliding joint into a desired position when such is attained. The remote operation (or actuation) of the sliding motion of this joint is attained by a user depressing a control button located at the distal terminus of the horizontal receiving bar and thereafter locking the joint into a desired position by releasing the button (as described in more detail, below.)

Figure 11:
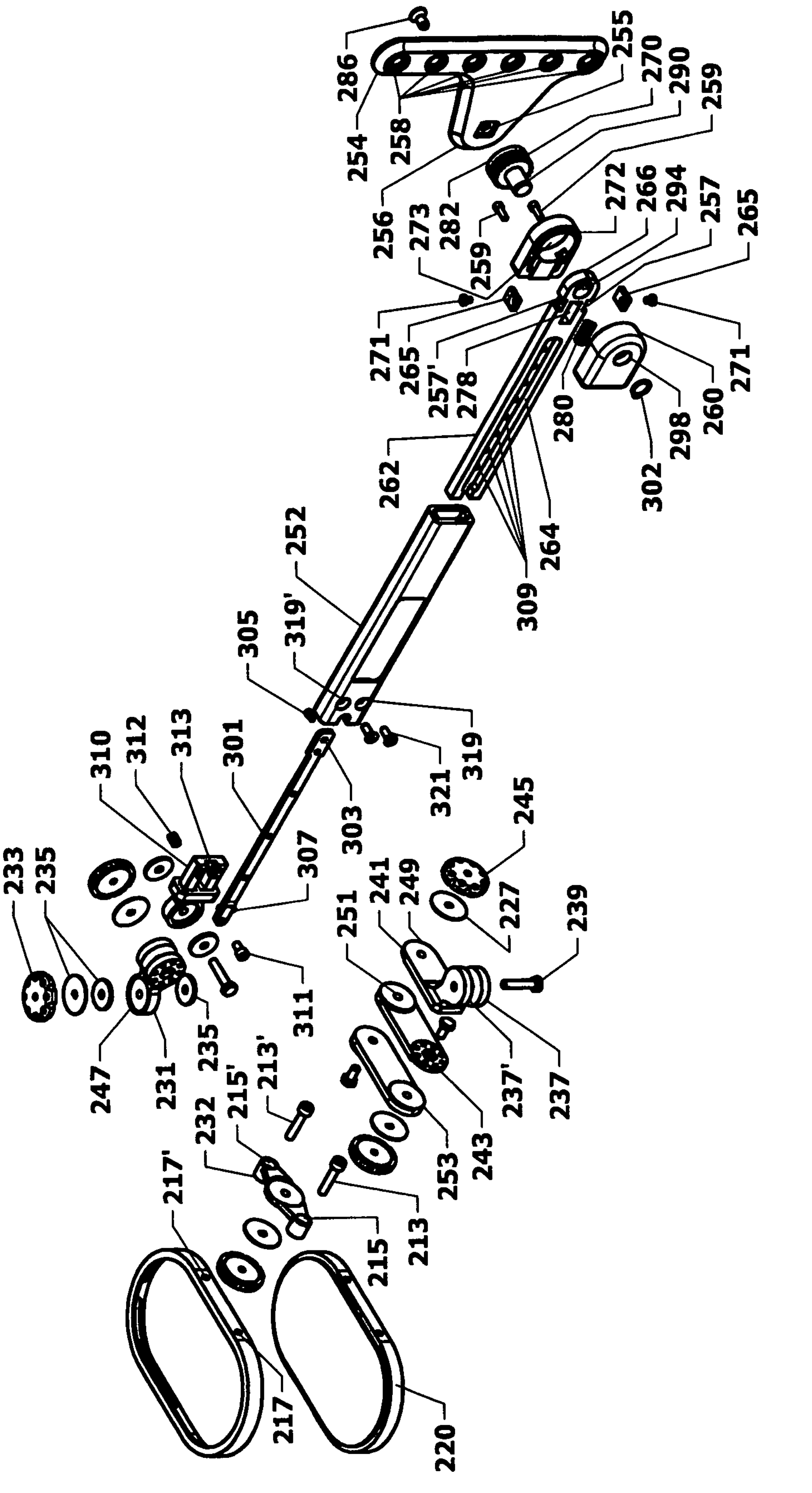
FIG. 11 is a rear isometric exploded view of the second alternate preferred embodiment of the present invention illustrated in FIG. 7.

The term "means for remotely operating" and "means for remote operation of" refer to means described, in detail, below to actuate and lock the above-described sliding joint and pivoting joint by manipulating the device distal (lateral to) the subject joint. Each of the remaining pivoting, sliding and rotating joint of the present invention require an operator to adjust and/or lock the subject joint directly at the joint location. In regard to the second alternate preferred embodiment of the present invention, all of such remaining joints not controlled by a remote means, utilize a control wheel, joint bolt, washer and joint lock nut in order to enable adjustment and locking of such joint movement. The operation of these components is discussed, in greater detail below, in regard to FIG. 11.

In contrast, the means for remotely operating and locking (or means for remote operation and locking) of the subject horizontal extension arm/mounting bracket pivoting joint and the horizontal extension arm/horizontal receiving arm are operated remote from the position of the joint they operate and lock. As described above, the subject means of remotely operating and locking the pivot joint and sliding joint is operated at a point located distal to said joints. This point of operation enables a operator to easily adjust and lock these joints—which are accessible in other embodiments only by manipulating the joints directly at their location behind the flat panel—without need for reaching behind a flat panel television or monitor upon which the speaker mounting device is mounted.

The specific configuration of an example of the second alternate preferred embodiment is discussed, in detail, directly below. Also as mentioned above and below, all of the pivoting, sliding and rotating joints of each and every one of the embodiments of the present invention enable independent control of any one or more of the six speaker position parameters described herein.

Figure 7:
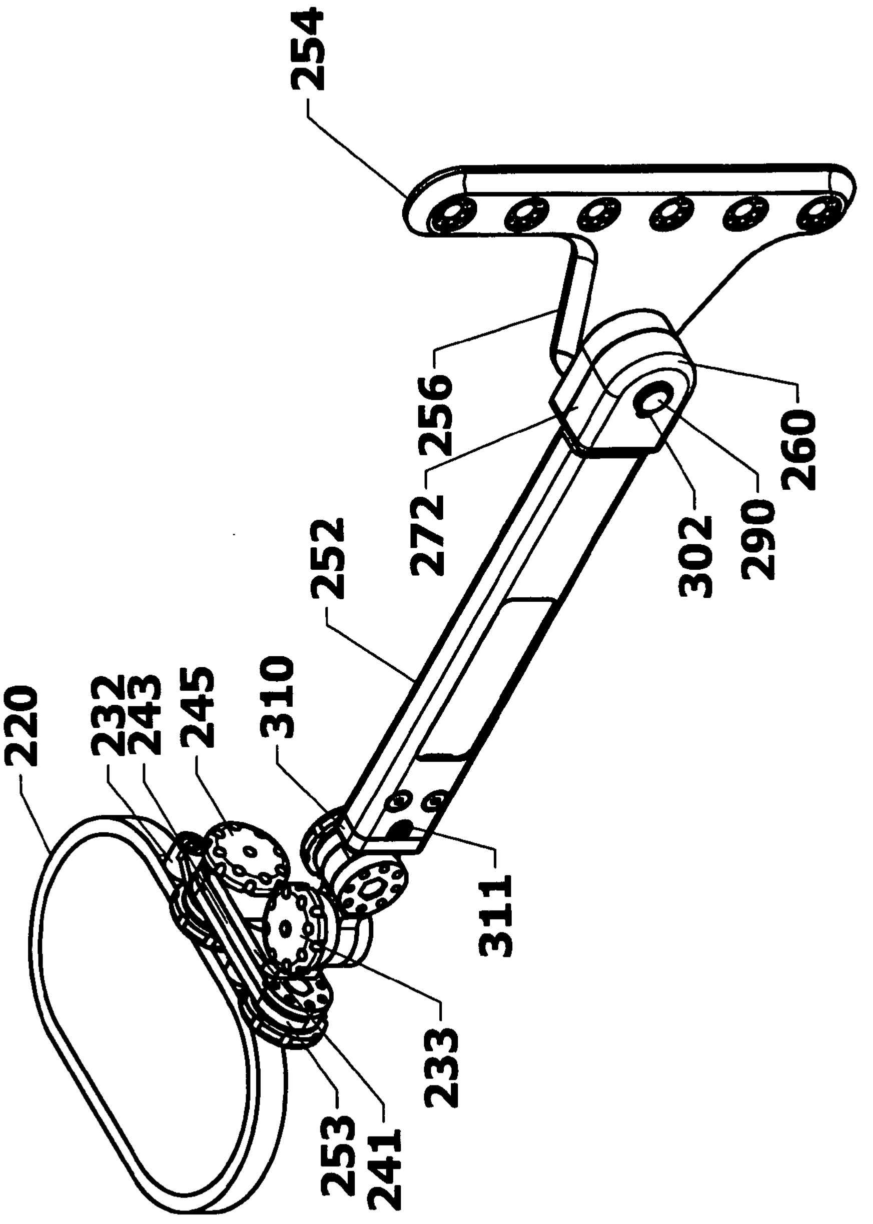
FIG. 7 is a rear isometric view of a second alternate preferred embodiment of the present invention.
Figure 8:
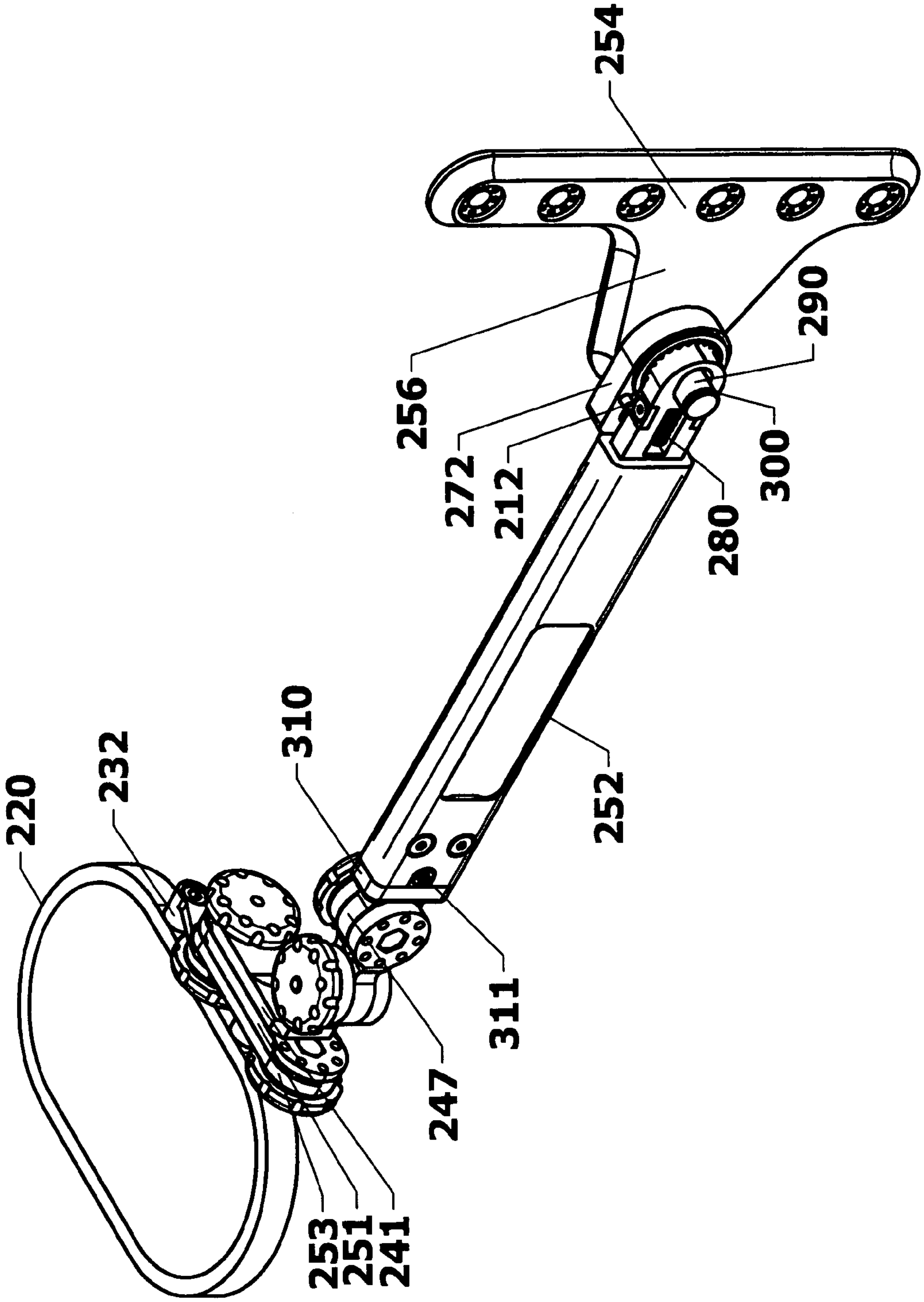
FIG. 8 is a rear isometric view of the second alternate preferred embodiment of the present invention illustrated in FIG. 7 wherein the outer housing of the receiving arm/mounting bracket pivot joint has been removed to provide an internal view.
Figure 9:
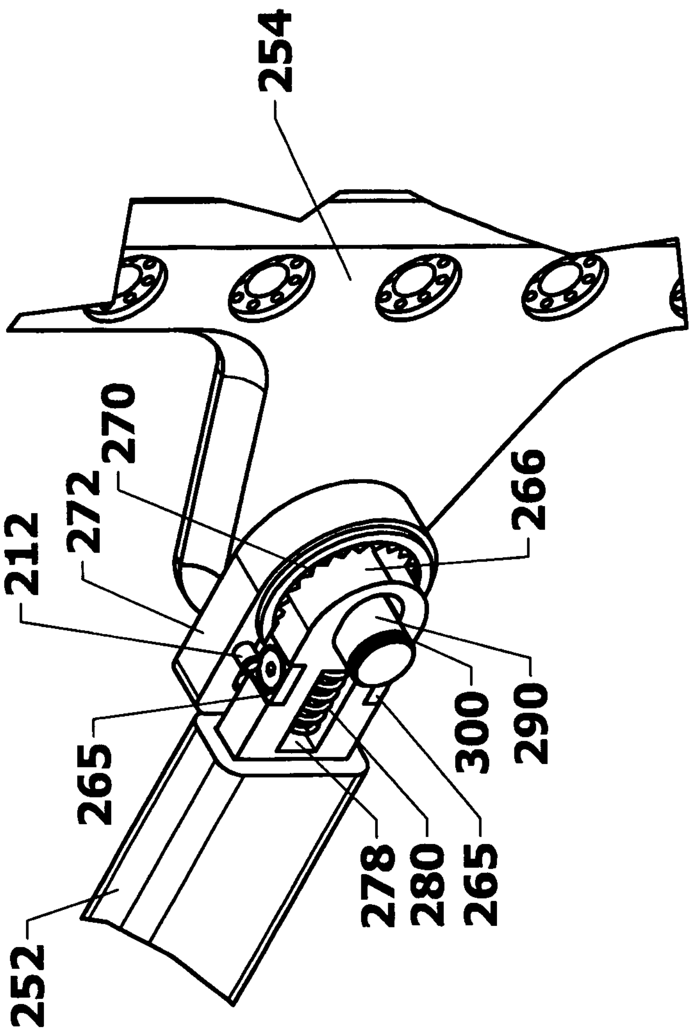
FIG. 9 is a sectional view of the proximal portion of the second alternate preferred embodiment shown in FIG. 8 illustrating the receiving arm/mounting bracket joint.
Figure 10:
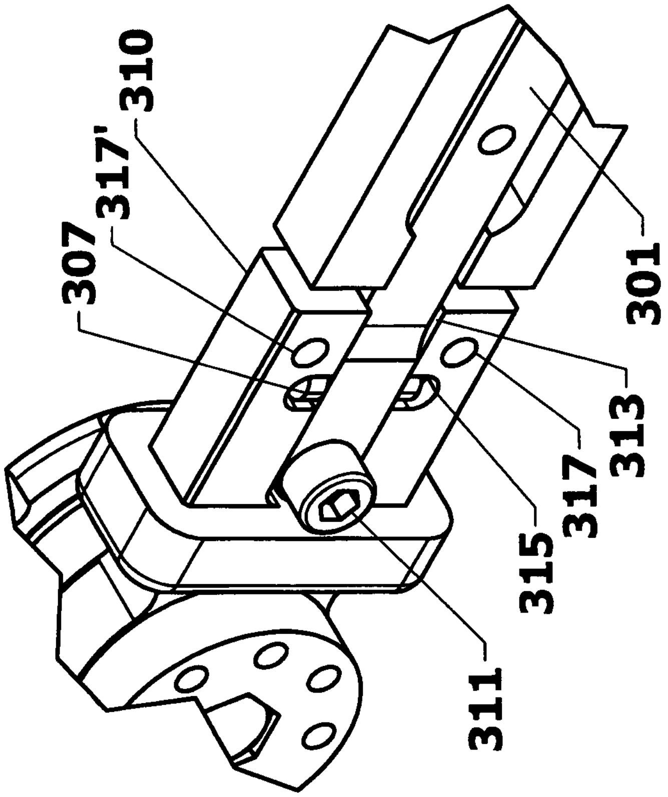
FIG. 10 is a section view of the second alternate preferred embodiment shown in FIG. 7.

FIG. 7 and FIG. 8 illustrate a second alternate preferred embodiment of the present invention incorporating the above-described remote means for operating and locking the horizontal receiving arm/mounting bracket pivot joint as well as a means for operating and locking the sliding joint formed between the horizontal receiving arm and horizontal extension arm (or, as can be referred to, as a means for enabling and locking lateral movement of the horizontal receiving arm.

In the second alternate preferred embodiment thereof illustrated in FIGS. 7 & 8 a speaker mounting apparatus especially configured and adapted for flat panel display devices which utilize any form of standardized wall, ceiling or pedestal mounts, including those comprised of two vertical, box like channels which are affixed to the back of such devices utilizing VESA mounting holes. Such vertical channels pose as obstruction and would, in certain instances, block placement of the receiving arm unless, for example, an elongated vertical section of the "F" brackets was utilized to place the horizontal receiving arm well under the inferior extent of the vertical channel mounts. However, it is to be understood that, in terms of the second alternate embodiment of the present invention, any mounting bracket discussed herein, including an L-shaped bracket, F-shaped bracket, H-shaped bracket, or any other bracket may be utilized so long as the subject bracket is adapted and configured to include mounting holes which are prepared to align with and allow a bolt placed therethrough to engage VESA threaded mounting holes located within the back panel of a flat panel display.

As shown in FIGS. 7 & 8, the second alternate preferred embodiment utilizes two flat L-shaped mounting arms only one of which 254, representing the right mounting arm (also referred to herein as mounting bracket) is illustrated in the figures. The L-shaped mounting arms are advantageously configured to include bracket mounting holes 258. The flat L-shaped mounting arms are especially formed and configured so that the aforementioned receiving holes will align with the standardized VESA bolt receiving plates, and the threaded bolt receiving bores formed therein, located on the majority of such devices. The two L-shaped brackets and the flat configuration thereof, in combination with the use of two separate receiving arms, enable the speaker mounting apparatus of the alternate preferred embodiments of the present invention to be mounted underneath or external to vertical channel mounting devices utilized to mount such display devices to walls, ceilings or, in some instances, at part of pedestal mounts. However, the second alternate preferred embodiment may utilize any form or shape of VESA hole engaging bracket, such as the L-shaped bracket, H-shaped brackets or any other configuration thereof so long as the bracket includes standardized mounting holes for engaging VESA pattern mounting holes and is formed to junction with and form a pivot joint with the horizontal extension arm, as described in detail, below.

In regard to FIGS. 7-11, each of the L-shaped arms is joined to a horizontal extension arm 262 via a pivoting joint that provides rotation about the "Z" axis so that the speaker pedestal, and speaker mounted thereupon, can be adjusted as to both roll position and as to height—although each of these position parameters can be adjusted independently the operation of the remaining device joints—. Provision of a pivoting joint between the device bracket which engages the VESA mounting holes of a flat screen display and the horizontal receiving (or in the case of the second alternate preferred embodiment, the horizontal extension arm) is common to all embodiments of the present invention as to the rotation about the "Z" axis such a joint provides. However, the second alternate preferred embodiment differs from the remaining embodiments disclosed herein in that the pivot joint located between the bracket and the extension/receiving arms is remotely operated and it is the extension arm, rather than the receiving arm, that forms a pivot joint with the panel mounting bracket.

A specific example of the remotely operated pivot joint of the second alternate preferred embodiment can best be described as follows. Referring to FIGS. 7-10, it can be shown that the each of the L-shaped arms (the right side shown in the figures) includes, an extension arm mounting tab 256. Each such mounting tab, in turn, includes a mounting bolt bore passing extending from the inner surface of the tab (that surface ordinarily mounted to the display panel) and connecting with a square shaped recess 277. The square shaped recess is especially shaped and configured to securely engage the square shaped proximal terminus of pivot joint alignment bushing 282. This alignment bushing provides a means of affixing the subject remotely controlled pivot joint to the L-shaped bracket via a threaded bolt receiving hole prepared centrally within the square shaped proximal surface of the alignment bushing 282. More specifically, an alignment bushing mounting bolt 286 passes through the mounting bolt bore prepared in the mounting tab and thereafter securely engages the receiving hole prepared centrally within the square shaped proximal surface of the pivot joint alignment gear. Thus affixed to the extension arm mounting tab, the alignment gear, via its below described pivot pin 290 provides the axis of rotation for the remotely operated and locked pivot joint as well as a means of locking same. Just distal to the square shaped proximal terminus of the alignment busing, the bushing is shaped and configured as a non-rotating multi-toothed gear 270.

The subject remotely operated and locked pivot joint is contained within an inner pivot joint housing 272 and an outer pivot joint housing 260. The inner pivot joint housing includes a central bore especially shaped and configured so that the non-rotating multi-toothed gear 270 of the alignment bushing fits therewithin. The inner surface of the inner pivot joint housing is also configured to include two flat indexing flat stop receiving grooves (257 & 257) as shown in the figures. The outer joint housing 260 is shaped and configured to mate with and be affixed, via screws 259 to the inner pivot joint housing. The inner surfaces of the outer pivot joint housing are formed to include a recess to enable placement therewithin of the indexing head 266 of the horizontal extension arm. In addition, the outer pivot joint housing includes an extension arm biasing spring mounting tab 281 so as to enable operation of the biasing spring 280 discussed, below and which tab is also configured to fit within the biasing spring recess discussed below. Both the inner and outer pivot joint housings also includes threaded assembly bores for affixing each of the housings to one another.

The proximal end of the horizontal extension arm 262 is shaped to form an indexing head 266. The indexing head is formed as a flattened terminus shaped in as a generally rounded end. A pivot pin bore 266 is prepared centrally within the indexing head so as to enable passage therethrough of the pivot pin 290 portion of the alignment bushing 282. The indexing head is ordinarily contained within the joint housings.

The inner surface of the inner pivot joint housing is shaped and configured to include a central bore 273 in turn shaped and configured so as to enable the multi-toothed, non rotating gear portion of the alignment bushing to fit therewithin. These teeth are especially shaped, positioned and sized so as to enable the flat indexing stops 265, firmly held in the above-described stop recess grooves 257 & 257' to securely engage the teeth so as to lock the joint against rotation when desired. A pivot pin 290, formed within the alignment bushing, extends outward, away from the center of the multi-toothed gear portion of the alignment bushing. This pivot pin, as discussed in more detail, below, provides the actual axis of pivot joint rotation (about the "Z" axis).

In the example of the second alternate preferred embodiment illustrated in FIGS. 7-11, extension arm 262, shaped as an elongated flattened bar, includes an rectangular actuator channel 264. The extension arm also includes, at its proximal terminus, the rounded pivot joint indexing head 266 (discussed above,) which is especially configured to enable rotation of the extension arm about the pivot pin 290. Also, as mentioned above, the pivot pin portion of the pivot alignment bushing passes through the central pivot pin bore 294 of the indexing head. When the subject joint is not being remotely operated, the aforementioned flat indexing stops are purposefully shaped and configured so as to enable engagement of said flat indexing stops with the teeth of the non-rotating multi-toothed gear 270 which is positioned within the inner and outer pivot housings.

The horizontal extension arm also includes, just distal to the indexing head, an extension arm spring retention slot 278 especially shaped and configured to contain an extension arm biasing spring (or as it may also be referred to, the indexing head biasing spring) 280. The indexing head biasing spring, at its distal end, is biased against the spring mounting tab 281 formed within the outer pivot housing, discussed above. At the proximal end of the spring it biases against the indexing head so as to cause the flat indexing stops mounted therewithin against teeth of the non-rotating multi-tooth gear of the alignment bushing. This engagement of the flat indexing stops with the gear teeth of course lock the extension arm in regard to rotation about the pivot pin.

More specifically, above and below the spring retention slot, upper and lower flat indexing stop receiving notches 257 & 257' are formed at the upper and lower edges of the horizontal extension arm so as to firmly engage flat indexing stops 265 and 265' which extend into the inner pivot joint housing. Screws 271 are utilized to affix the stops to the extension bar by passing through central bores formed in the lands and then into threaded bores prepared within the extension arm.

As discussed above, the pivot joint alignment bushing 282 is affixed to the mounting tab portion of the L-shaped arms via a square shaped mounting recess 255 which is shaped and configured for secure and stable receipt of a square shaped mounting extension 269 formed upon the inner surface of the joint alignment bushing 282. An alignment bushing mounting bolt 286 is utilized to affix the joint alignment pin, at is inner surface, to the mounting tab via a threaded bore prepared centrally within the square mounting extension and the tab. Thus held securely to the L shaped bracket, the alignment bushing serves to align and join the inner pivot joint housing 272 with the outer pivot joint housing 260 along with housing assembly screws 259. More specifically, the joint alignment bushing is especially shaped and configured so that the non-rotating multi-toothed non-rotating gear formed thereupon securely fits within the central bushing bore 273 prepared within the inner pivot joint housing 272. The outer flat portion of the gear is configured and adapted to lie flush against the inner surface of the pivot joint indexing head 268 of the horizontal extension arm and enable rotation thereof. The pivot pin 290 extending centrally from the outer surface of the non-rotating multi-toothed gear passes through the central bore of the indexing head 294 and thereafter passes through the pivot pin bore 298 formed in the outer pivot joint housing 260. A circumferential clamp groove 300 for adjacent to the distal terminus of the pivot pin is especially configured and adapted to enable a pivot pin clamp 302, to engage and lock in the groove, thus affixing the joint housings together while allowing rotation of the indexing head 266 therewithin.

The operation of the remotely operated and locked pivot join of the second alternate preferred embodiment can best be described as follows: Referring to FIG. 7-11, the remotely controlled and operated pivot joint enables the horizontal extension arm 262 to rotate about the "Z" axis formed by the alignment bushing pivot pin 290 as follows. The extension arm biasing spring 280 is located within spring recess 278 formed adjacent to the indexing head within the horizontal extension arm. The distal end of the spring is held in place by a spring mounting tab 281 arising from the outer pivot joint housing adjacent to the distal end of the spring. Conversely, the proximal end of the spring is in contact with and free extends and biases against the distal surface of the indexing head 263 at the proximal terminus of the spring recess 278. Ordinarily, indexing head biasing spring 280, held, at its distal end by the spring mounting tab, is biased against so as to force the indexing head proximally. This proximal biasing of the indexing head causes the flat indexing stops 265, positioned with the stop receiving notches 257 & 25T formed thereupon to move proximally, along the inner housing stop grooves so as to firmly engage the non-rotating multi-toothed gear portion of the pivot joint alignment bushing 282. This engagement, in turn, prevents the extension arm from rotating about the pivot pin 290. Thus the pivot joint is ordinarily locked against rotation.

By applying lateral force to the horizontal receiving bar proximate to the distal end thereof (by applying force laterally, away from the mounting bracket and display device), the indexing biasing spring 280 is thereby compressed, allowing the indexing head 266 to move distally, away from the non-rotating multi-toothed gear 270. A lateral extension limiting pin 212, extending from the inner surface of the inner pivot housing and lying within the confines of the flat stop groove, acts to limit the extent of lateral displacement of the extension arm. Once moved to this lateral position, the flat indexing stops 265 no longer engage any of the teeth of the multi-tooth gear. Thus the indexing head 266 may be freely rotated about the pivot pin 290 portion of the alignment bushing 282 by simply applying an upward or downward force to the distal end of the horizontal receiving arm 252 (while maintaining a lateral force so as to compress the biasing spring.).

The pivoting movement provided by the afore mentioned joint, enables movement of the remainder of the device in an arcuate like pattern about the axis of rotation provided by the pivot pin of the remotely operated and locked pivot joint. The rotation provided, as in the case of all embodiments of the present invention in regard to the joint formed between the mounting bracket (such as the "L" shaped mounting bracket) and the extension/receiving arms is rotation about the "Z" axis. Such rotation, in turn will enable a change in the roll position (inward/outward tilt) of a speaker mounted upon the speaker platform as well as a change in speaker height. However, by operating the remaining joints formed in the device, independent positioning of all 6 parameters is made possible.

After the remotely operated and locked pivot joint is rotated to a desired position, simply releasing the lateral force applied to the distal end of the horizontal receiving arm 252. In the absence of device manipulation, an extension arm biasing spring 280 causes the extension arm to move proximally with the flat indexing stops 265, located at the upper and lower edges of the extension arm, just distal to the indexing head (and within the flat stop recess mounting grooves 257) to also move proximally, within the inner pivot joint housing. As the stop s move forward, they again engage the teeth formed about the non-rotating multi-tooth gear 270 portion of the alignment bushing so as to lock the joint in position.

Thus, the second alternate preferred embodiment of the present invention includes a means for remotely adjusting and locking the pivot joint formed at the junction of the proximal end of the horizontal extension arm and the mounting bracket ("L" shaped bracket). For practical purposes, this remotely operated joint enables an operator to change the roll position of a speaker mounted upon the speaker platform without having to directly contact and manipulate the pivot joint located between the extension arm and the mounting bracket.

As discussed above, the extension arm 262 of the second alternate preferred embodiment includes a rectangular actuator channel 264. The actuator channel is especially adapted and configured to slideably contain a slide joint actuator bar 301.

The slide joint actuator bar 301, formed as a flattened elongated strip, contains, at its proximal end, an indexing bore 303 especially configured and adapted to securely receive an actuator bar indexing pin 305. Adjacent to the distal terminus of the slide joint actuator bar 301, a transverse pivot bar 307 is formed so as to enable, as discussed above, the slide joint actuator bar to be pivoted at that point. Just adjacent to the distal terminus of the slide joint actuator bar, a slide joint actuator bore is formed so as to enable a slide joint actuator button 311 to be fitted therewith and extend away from the bar. A slide joint actuator bar locking spring 312 is fitted to one end of the behind the actuator bar opposite the button at this position so as to supply a biasing force to: 1. Force the actuator bar button outward; and 2. pivot the actuator bar across the transverse pivot bar 307 so as to force the indexing pin 305 against the inner surface of the regulator actuator channel 264 and into a selected locking bore 309 (of a plurality) formed therewithin. At its distal end, the slide joint actuator bar 301 is contained within the end cap 310. The end cap 310 also includes a transverse pivot bar groove 315 for receiving and enabling operation of the pivot bar 307 as well as a longitudinal operation slot 317 that enables pivoting operation of the slide joint actuator bar when the slide joint actuator button 311 is depressed.

With the slide joint actuator bar placed within the actuator channel 264 of the horizontal extension arm 262, the distal terminus of the actuator bar is fitted within the end cap 310 of the horizontal receiving tube so that the pivot bar 307 rests within the transverse pivot bar groove 315 and the remainder of the actuator bar rests within the longitudinal operation slot. Thus placed, the transverse pivot bar 307 forms a fulcrum upon which the slide joint actuator bar can pivot. The end cap 310 of the horizontal receiving arm is well adapted to fit within the distal portion of the horizontal receiving arm 252. So fitted, internally threaded assembly bolt receiving bores 317 formed within the end cap align with assembly bores 319 formed adjacent to the distal terminus of the horizontal receiving arm so as to enable assembly screws 321 to be utilized to affix the end cap to the receiving arm. Thus affixed, slide joint actuator button 311 extends through actuator button groove 333 so as to provide access to the button and button operation.

In the second alternate preferred embodiment of the present invention, the horizontal receiving arm 252 is formed generally as a hollow rectangular bar slideably mounted coaxially over the horizontal extension arm as shown in FIGS. 7 to 11. In this particular embodiment, the horizontal extension arm is fixed as to lateral movement due to its affixation to the above-described pivot joint which, in turn, is affixed to the "L" shaped mounting bracket. In the remaining embodiments of the present invention, it is the horizontal receiving arm that is affixed to and forms a pivot joint with the mounting bracket. However, the sliding relationship between the horizontal receiving arm and extension arm in all embodiments provide the same adjustment in lateral distance of the speaker platform from the display to which the device is mounted.

Thus, the speaker mounting device of the second alternate preferred embodiment provides lateral extension and retraction of the device via movement of the horizontal receiving arm along the fixed extension arm. This movement is remotely operated (actuated) and locked via operation of the above described slide joint actuator button 311, transverse pivot bar 307, actuator bar locking spring 312, actuator bar indexing pin 305 and actuator lock bores 309 discussed above and below. The actual operation of the remotely operated and locked sliding extension arm/receiving arm joint of this embodiment can be more specifically described as follows:

The actuator bar locking spring 312 ordinarily biases the distal end of the slide joint actuator bar outward, towards the slide joint actuator button 311. Accordingly, that portion of the slide joint actuator bar proximal to the pivot bar 307 is biased inward thereby forcing the indexing pin 305 towards the inside surface of the actuator bar channel 264 in which a plurality of actuator pin locking bores 309 have been prepared. Thus, in a selected locked condition, the actuator indexing pin 305 is forced into and retained with one of the plurality of locking bores 309 by the biasing force applied to the slide joint actuator bar by the actuator bar locking spring 312 located, as discussed above, distal to the transverse pivot bar 307. Lateral movement (adjustment of the joint) in this locked condition is not possible Lateral extension or retraction of the slide joint formed by the horizontal extension arm and the horizontal receiving tube (which is slideably mounted thereupon) can be accomplished—remotely—as follows: Depressing the actuator bar control button 311 causes actuator locking spring 312 to compress while the actuator bar pivots upon the pivot bar 307 located just proximal to the control button. Accordingly, that portion of the slide joint actuator bar 301 proximal to the actuator pivot bar is caused to move outward, away from the inner surface of the actuator channel having a plurality of locking bores 309 prepared therewithin. As the proximal portion of the actuator bar so moves outward, the actuator indexing pin, affixed to the surface of the actuator bar facing the locking bores, is caused to move outward, away from the locking bores. Thus, the slide joint formed between the horizontal receiving tube and horizontal extension bar is now operable as the receiving tube may be extended and retracted to obtain a desired lateral distance of the speaker platform, to which it is ultimately attached, from the flat screen. Once a desired lateral position is obtained, releasing pressure from the actuator bar control button 311 allows the actuator locking spring to once again apply an outward force to the distal end of the actuator bar, thereby 25—pivoting the proximal portion of the actuator bar, and the actuator indexing pin attached thereto, towards engagement with a selected locking bore. A slight extension or retraction of the horizontal receiving arm 252 allows the pin to enter one locking bores located adjacent thereto.

Thus, the second alternate preferred embodiment of the present invention provides a speaker mounting device providing remote operation and locking of a slide joint formed between the horizontal extension arm and the horizontal receiving arm mounted slideably thereupon. In addition, and as described above, the second alternate preferred embodiment of the present invention provides remote operation and locking of a pivot joint formed and located and the junction of the horizontal extension arm and the mounting bracket ("L" shaped bracket in regard to the example illustrated in the figures).

The remaining joints utilized in the second alternate preferred embodiment of the present invention are not remotely locked or activated (operated). They do, however, provide secure locking as well as facilitation of adjustment. As shown in FIG. 7, the illustrated example of the second alternate preferred embodiment of the present invention includes a mounting bracket 254 especially configure and adapted for engaging VESA mounting holes located in the back panel of most flat screen display devices via mounting bores 258 which are configured to align with such VESA mounting holes and which enable ordinary bolts to be utilized to affix the bracket to a flat screen device. The mounting bracket 254 includes a mounting tab section 256 especially configure and adapted, as discussed in detail above, to form a junction and pivot joint with the horizontal extension arm 262. This pivot joint, as discussed above, is configured as a remotely operated and locked pivot joint. Likewise, the slide joint formed between the horizontal extension arm 262 and horizontal receiving arm 252 is, as discussed above, remotely operated and locked. However, moving distally from this joint (beyond the manually controlled joint formed between the horizontal receiving tube and pivot bracket) the joint formed between the pivot bracket 247 and sway arm 241 is, like the remainder of joints provided herein, a directly controlled joint wherein joint actuation and locking is effected directly at the joint.

For this purpose, bolt 239 is especially configured and adapted to engage and pass through centrally located bores prepared within horizontal joint assembly flanges 237 & 237' of the sway arm as well as centrally located bores formed within washers 235. Control wheel 233 includes a centrally located threaded bore especially configured and adapted to securely receive bolt 239. The pivot bracket includes horizontal assembly joint flange 231 which also includes a central bore configured and adapted to enable secure passage of bolt 239. The joint formed between the pivot bracket and sway bar of the second alternate preferred embodiment is formed via placement of pivot bracket assembly joint flange 231 between the two horizontal joint flanges 237 & 237' of the sway arm so that the central bores prepared therethrough are in axial alignment. In addition, washers 235 are positioned above, between and below the horizontal joint flanges also with such bore alignment thereby enabling bolt 239 to pass, from below through the central bore of flange 237', the bore of a washer, through flange 231, through the central bore of an additional washer, through the central bore of flange 237—thereafter extending above flange 237 whereupon the bolt engages and is secured to control wheel 233 via engagement of the internally threaded bores located, centrally, through the wheel.

It is easily understood that tightening of the control wheel 233 causes the flanges of the pivot bracket and sway arm to be firmly engaged with one another. Such engagement, aided by use of the above-mentioned washers, causes the joint to be placed in a locked condition—when the control wheel is tightened—. Conversely, when the control wheel is rotated towards a loosened position, the pivot bracket/sway arm joint—which joint provides a yaw adjustment of the platform (or inward/outward tilt)—is freely adjustable. Unlike the remotely operated and locked pivot joint formed between the horizontal extension arm/mounting bracket or the remotely operated and locked sliding joint formed between the extension arm and the receiving arm, the pivot joint formed between the sway arm and pivot bracket require directly manipulation at the joint location itself in order to enable operation of the joint or locking thereof. The control wheel, washers, flanges and bolts that comprise this joint form an articulating and locking joint. However, as with all joints peripheral to the above described sliding joint formed between the horizontal extension arm and receiving arm, operation and locking of the joint requires one to apply tightening and or loosening forces directly to the joint location via rotation of the control wheel For example, the joint formed between the sway arm 241 and the intermediate arm 243 is, as in all embodiment of the present invention, a rotating joint enabling adjustment of upward/downward tilt (pitch adjustment) of a speaker mounted upon the speaker platform. In the same manner as all remaining joints of the second alternate preferred embodiment, the sway arm/intermediate arm rotating joint is controlled by the tightening and loosening of control wheel 245. Tightening of this wheel causes a bolt, which passes through a bore located centrally upon sway arm flange 249 intermediate arm flange 251 as well as washer 227 to cause the joint to become fixed in a desired position. Conversely, loosening of the control wheel enables direct manipulation of the yaw position of the speaker platform.

The second alternate preferred embodiment of the present invention also includes, at the junction of the intermediate arm 250 and tertiary arm 253 a rotating intermediate/tertiary joint that provides the same adjustment in height position and/or forward/backward cant (pitch adjustment) as provided by this joint in all embodiments. This joint also utilizes the same flange, washer, control wheel and bolt system for forming this rotating joint. As all other directly operated and locked joints of the second alternate preferred embodiment, rotating the control wheel so as to loosen the rotating intermediate/tertiary enables one to rotate the joint so as to adjust the height and/or forward/backward pitch of a speaker mounted upon the device platform. Conversely, tightening the joint via reverse rotation of the control wheel (thereby further and more tightly engaging the bolt) locks the joint into a desired position.

The second alternate preferred embodiment of the present invention also includes, at the junction of the tertiary arm 253 and the platform arm 232 a rotating tertiary/platform joint that provides the same adjustment of forward/backward cant (pitch adjustment) as provided by this joint in all embodiments. Direct operation and locking of this joint is, once again, provided by articulation of two flanges held in contact via a joint bolt, control wheel and enhanced by a washer(s). However, in the embodiment illustrated in FIGS. 7-11, the platform arm is configured with a centrally located joint flange 222. As shown in FIG. 8, the second alternate preferred embodiment utilizes two mounting bolts 213 & 213' passing through platform arm bores 215 & 215' and into threaded platform receiving bores 217 & 217' for mounting the speaker platform 220 to the platform arm 219.

Although the second alternate preferred embodiment of the present invention, provides the same full range of speaker positioning by means of incorporating rotating, sliding and pivoting joints providing the same position adjustment functions as in all embodiments disclosed herein, the second alternate preferred embodiment provides such speaker positioning with the additional advantages of remote operation and locking of the mounting bracket/extension arm joint and the sliding joint formed between the horizontal extension arm and horizontal receiving arm. All other joints of the second preferred embodiment are configured to provide direct operation and locking of the joints through rotation of control wheels located directly at each such joint and in axial alignment therewith.

It is also contemplated that, in addition to speakers, the device may be adapted to include platforms (other than speaker platforms) especially shaped and configured to enable the mounting of other devices and objects (in addition to speakers). Such platforms are affixed to a platform arm in the same manner and in the same functional relation as the speaker platform (discussed above). The shape of such platforms is such as to facilitate mounting of the below described peripheral devices and documents. In certain instances, the speaker mounting platform described above is also suitable for mounting objects that would, by virtue of their size and shape, be easily mounted thereupon. In other instances, the mounting platform is simply shaped to accurately receive and hold such objects. For example, the device of the present invention may be configured to include a platform(s) especially configured to hold web cameras, microphones, cell phones and cam corders. Also, the device may include a platform utilized to hold media players and recorders, such as, for example, mp3 players, ipods, pocket PC devices, multimedia car readers, computer pointing devices (e.g. mouse), document holders, external drives (e.g. disc drives including hard and removable media drives), computer modems and digital picture displays.

The terms and expressions which have been employed in the foregoing specification are used therein as terms of description and not limitation, and there is no intention, in the use of such terms and expressions, of excluding equivalents of the features shown and described or portions thereof, it being recognized that the scope of the invention is defined and limited only by the following claims.

I claim:

1. A speaker mounting device especially configured and adapted for mounting at least two speakers to a flat panel display device wherein said device comprises at least one mounting bracket especially configured and adapted to align with and enable engagement of said bracket with standardized threaded receiving holes located within a mounting plate incorporated in a back surface of a flat panel display device, two extension arm having proximal and distal end, two receiving arms having proximal and distal end, two pivot arms having proximal and distal end, two pivot brackets having proximal and distal end, two sway arms having proximal and distal end, two intermediate arms having proximal and distal end, two tertiary arms having proximal and distal end, two platform arms;

two speaker mounting platforms and a remote means of actuating and locking a pivot joint formed between the proximal end of the extension arms and the mounting bracket wherein said mounting device enables adjustment of position of each of the at least two speakers mounted to a flat panel display device thereby in regard to six different speaker position parameters comprising height, separation, depth, upward/downward tilt, inboard/outboard tilt and right/left cant wherein, adjustment of any one of the foregoing position parameters may be accomplished independently without altering the remaining position parameters.

2. The speaker mounting device of claim 1 wherein said device further comprises a remote control means of actuating and locking a rotating joint formed between the rotating joint, formed between the distal end of the extension arms and the proximal ends of the pivot arms.

3. The speaker mounting device of claim 1 wherein the at least one mounting bracket is an H-shaped bracket especially configured and adapted to receive and be affixed to the two extension arms.

4. The speaker mounting device of claim 1 wherein the at least one mounting bracket is an L-shaped bracket.

5. The speaker mounting device of claim 1 wherein the L-shaped bracket includes a horizontal extension arm receiving tab especially configured and adapted for affixation the horizontal extension arm.

6. The speaker mounting device of claim 4 wherein a receiving arm mounting tab is located at an inferior terminus of the L-shaped bracket, said mounting tab including a mounting bolt bore therein especially configured and adapted to enable pivotal affixation of an extension arm to the L-shaped bracket.

7. The speaker mounting device of claim 1 wherein the at least one mounting bracket, at least two receiving arm, two extension arms, two pivot arms, two pivot brackets, two sway arms, two intermediate arms, two tertiary arms, two platform arms and speaker mounting platforms are fabricated from a metallic material.

8. The speaker mounting device of claim 6 wherein said metallic material is selected from the group consisting of steel, steel alloy, aluminum and aluminum alloy materials.

9. The speaker mounting device of claim 1 wherein the at least one mounting bracket, at least one receiving arm, two extension arms, two pivot arms, two pivot brackets, two sway arms, two intermediate arms, two tertiary arms, two platform arms and two speaker platforms are fabricated from a plastic material.

10. The speaker mounting device of claim 8 wherein the plastic material is selected from the group consisting of polycarbonate, polyester, polyvinyl and polyacrylate plastic materials.

11. The speaker mounting device of claim 1 wherein the at least one mounting bracket, at least one receiving arm, two extension arms, two pivot arms, two pivot brackets, two sway arms, two intermediate arms, two tertiary arms, two platform arms and two speaker platforms are fabricated from a reinforced plastic material.

12. The speaker mounting device of claim 10 wherein the reinforced plastic material is selected from the group consisting of composite plastic, fiberglass and graphite filled resin materials.

13. A speaker mounting device especially configured and adapted for mounting at least two speakers to a flat panel display device wherein said device comprises two mounting brackets especially configured and adapted to align with and enable engagement of said bracket with standardized threaded receiving holes located within a mounting plate incorporated in a back surface of a flat panel display device;

at least one receiving arm;

two extension arms;

two pivot arms;

two pivot brackets;

two sway arms;

two intermediate arms;

two tertiary arms;

two platform arms;

a means of remotely actuating and locking a pivot joint located between the proximal end of the extension arms and the two mounting brackets;

a means and of remotely actuating and locking a rotating joint located between the distal end of the extension arms and the proximal ends of the pivot arms; and two mounting platforms wherein said mounting device enables independent adjustment of position of each of the at least two speakers mounted to a flat panel display device thereby in regard to six different speaker position parameters wherein said position parameters comprise height, separation, depth, upward/downward tilt, inboard/outboard tilt and right/left cant.

14. The speaker mounting device of claim 13 wherein the mounting platforms are especially configured, shaped and adapted for mounting peripheral devices to the flat screen display device.

15. The speaker mounting device of claim 14 wherein said peripheral devices are selected from the group consisting of web cameras, microphones, cell phones and cam corders.

16. The speaker mounting device of claim 14 wherein said peripheral devices are selected from the group consisting of mp3 players, pocket PC devices, multimedia car readers, computer pointing devices (e.g. mouse), modems and computer memory storage devices.

17. The speaker mounting device of claim 14 wherein said mounting platforms are especially configured and adapted for mounting digital picture displays.

18. The speaker mounting device of claim 13 wherein said mounting platform is especially configured and adapted for holding documents.

* * * * *